US012585651B1

(12) United States Patent
Gyryk et al.

(10) Patent No.: US 12,585,651 B1
(45) Date of Patent: Mar. 24, 2026

(54) EXECUTION OF A QUERY USING A DYNAMIC LIBRARY

(71) Applicant: Cisco Technology, Inc., San Jose, CA (US)

(72) Inventors: Oleksandr Gyryk, Livermore, CA (US); Venkatasubramanian Jayaraman, Issaquah, WA (US); Vinay Manivel, San Jose, CA (US); Christopher Ogle, San Jose, CA (US); Kezhi Xiong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 19/065,784

(22) Filed: Feb. 27, 2025

(51) Int. Cl.
G06F 16/245 (2019.01)
G06F 16/2453 (2019.01)

(52) U.S. Cl.
CPC .............................. G06F 16/24542 (2019.01)

(58) Field of Classification Search
CPC ......... G06F 16/24542; G06F 16/24553; G06F 16/2471
See application file for complete search history.

(56) References Cited

U.S. PATENT DOCUMENTS

| | | | | |
|---|---|---|---|---|
| 7,917,495 B1 * | 3/2011 | Chapman | .......... | G06F 16/24532 |
| | | | | 707/718 |
| 10,769,148 B1 * | 9/2020 | Binkert | ............. | G06F 16/24542 |
| 12,298,977 B1 * | 5/2025 | Nagel | ............... | G06F 16/24545 |
| 2019/0147092 A1 * | 5/2019 | Pal | ........................ | H04L 67/125 |
| | | | | 707/713 |
| 2020/0409949 A1 * | 12/2020 | Saxena | ................. | G06F 16/285 |
| 2023/0010912 A1 * | 1/2023 | Arnold | ................ | G06F 16/2455 |
| 2023/0080220 A1 * | 3/2023 | Kläbe | ............... | G06F 16/24549 |
| | | | | 707/713 |

* cited by examiner

*Primary Examiner* — Alicia M Willoughby
(74) *Attorney, Agent, or Firm* — Shook, Hardy & Bacon L.L.P.

(57) ABSTRACT

A query coordinator can receive a portion of a query from a first distributed data processing system. The query coordinator can identify a second distributed data processing system to execute the portion of the query. Based on identifying the second distributed data processing system, the query coordinator can communicate the portion of the query to a scheme generator. The scheme generator can generate a query processing scheme using the portion of the query and can communicate the query processing scheme to a server associated with the second distributed data processing system. The server can resolve a first portion of the query processing scheme for the second distributed data processing system using a dynamic library as the second distributed data processing system generates a query plan for execution of the portion of the query.

20 Claims, 10 Drawing Sheets

EXECUTION OF A QUERY USING A DYNAMIC LIBRARY

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services® (AWS®), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems preprocess data based on anticipated data analysis needs. In particular, specified data items may be extracted from the generated data and stored in a data system to facilitate efficient retrieval and analysis of those data items at a later time. At least some of the remainder of the generated data is typically discarded during preprocessing.

Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

The present disclosure is illustrated by way of example, and not limitation, in the figures of the accompanying drawings, in which like reference numerals indicate similar elements and in which.

DETAILED DESCRIPTION

Figure 1:
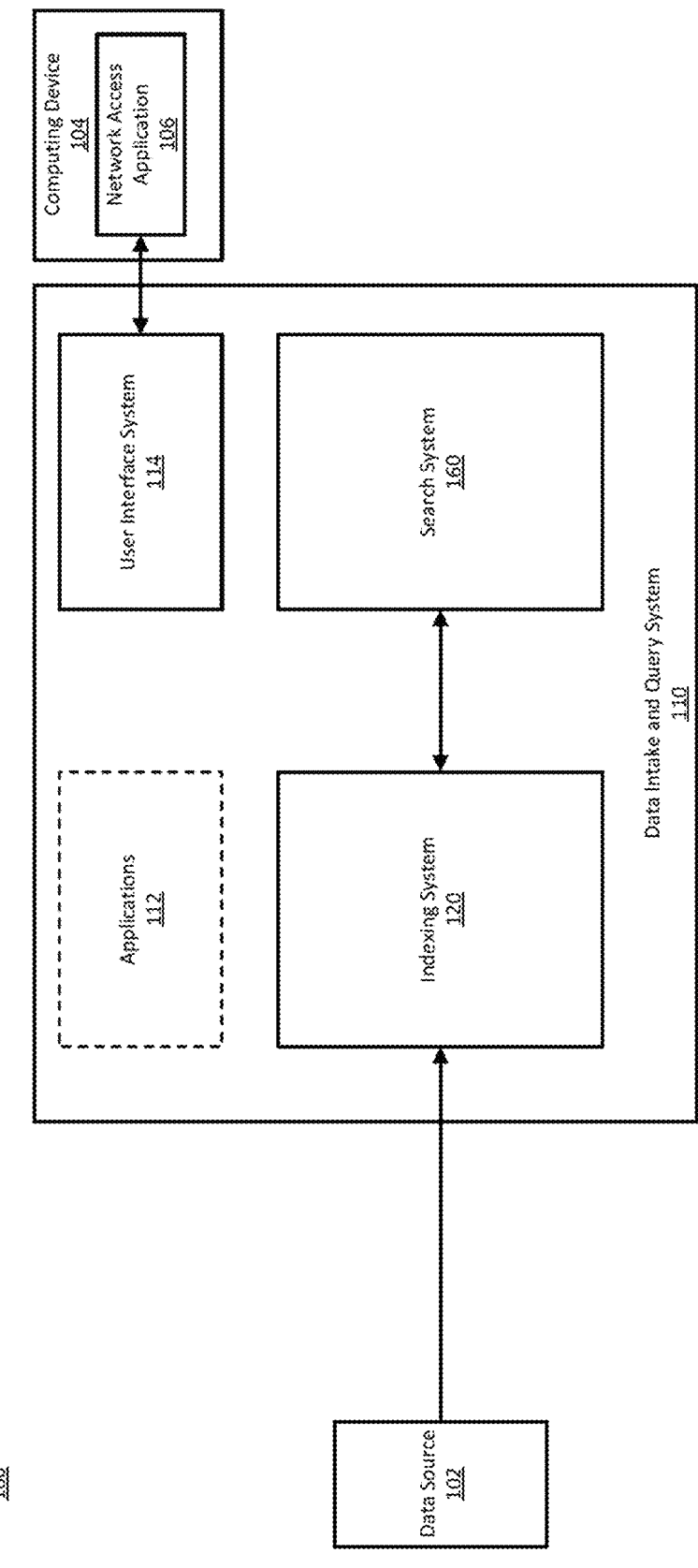
FIG. 1 is a block diagram of an example computing environment, in accordance with example embodiments.

Embodiments are described herein according to the following outline:

1.0. GENERAL OVERVIEW
2.0. QUERY EXECUTION VIA DATA PROCESSING SYSTEMS OVERVIEW
  2.1. ARCHITECTURE FOR QUERY EXECUTION
  2.2. EXECUTING A QUERY USING A DYNAMIC LIBRARY
  2.3. EXECUTION OF A QUERY BASED ON RESOLUTION OF A QUERY PROCESSING SCHEME
3.0. DATA PROCESSING SYSTEM ARCHITECTURE
4.0. HARDWARE EMBODIMENT
5.0. TERMINOLOGY

In this description, references to "an embodiment," "one embodiment," or the like, mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

1.0. General Overview

FIG. 1 is a block diagram illustrating an example computing environment 100 that includes a data intake and query system 110. The data intake and query system 110 obtains data from a data source 102 in the computing environment 100, and ingests the data using an indexing system 120. A search system 160 of the data intake and query system 110 enables users to navigate the indexed data. Though drawn with separate boxes in FIG. 1, in some implementations the indexing system 120 and the search system 160 can have overlapping components. A computing device 104, running a network access application 106, can communicate with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 110 can further optionally include applications 112 that extend the search, analytics, and/or visualization capabilities of the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can be executed on a single computing device, or execution of the program code can be distributed over multiple computing devices. For example, the program code can include instructions for both indexing and search components (which may be part of the indexing system 120 and/or the search system 160, respectively), which can be executed on a computing device that also provides the data source 102. As another example, the program code can be executed on one computing device, where execution of the program code provides both indexing and search components, while another copy of the program code executes on a second computing device that provides the data source 102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 120 obtains machine data from the data source 102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index may identify portions of the events (e.g., keywords). The indexing system 120 does not require prior knowledge of the structure of incoming data (e.g., the indexing system 120 does not need to be provided with a schema describing the data). Additionally, the indexing system 120 retains a copy of the data as it was received by the indexing system 120 such that the original data is always available for searching (e.g., no data is discarded, though, in some examples, the indexing system 120 can be configured to do so).

The search system 160 searches the data stored by the indexing system 120. As discussed in greater detail below, the search system 160 enables users associated with the computing environment 100 (and possibly also other users) to navigate the data, generate reports, and visualize search results in "dashboards" output using a graphical interface. Using the facilities of the search system 160, users can obtain insights about the data, such as keywords, calculating metrics, searching for specific conditions within a rolling time window, identifying patterns in the data, and predicting future trends, among other examples. To achieve greater efficiency, the search system 160 can apply map-reduce methods to parallelize searching of large volumes of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries that are to be processed by the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a user-name, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the admin-istrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instruc-tions for execution by the one or more processors. The computing device 104 can further include input/output (I/O) hardware and a network interface. Applications executed by the computing device 104 can include a network access application 106, such as a web browser, which can use a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 104. In such examples, the network access application 106 can access the user interface system 114 without going over a network.

The data intake and query system 110 can optionally include applications 112. An app of the data intake and query system 110 is a collection of configurations, knowledge objects (a user-defined entity that enriches the data in the data intake and query system 110), views, and dashboards that may provide additional functionality, different tech-niques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in prac-tical implementations, the computing environment 100 con-tains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

Figure 2:
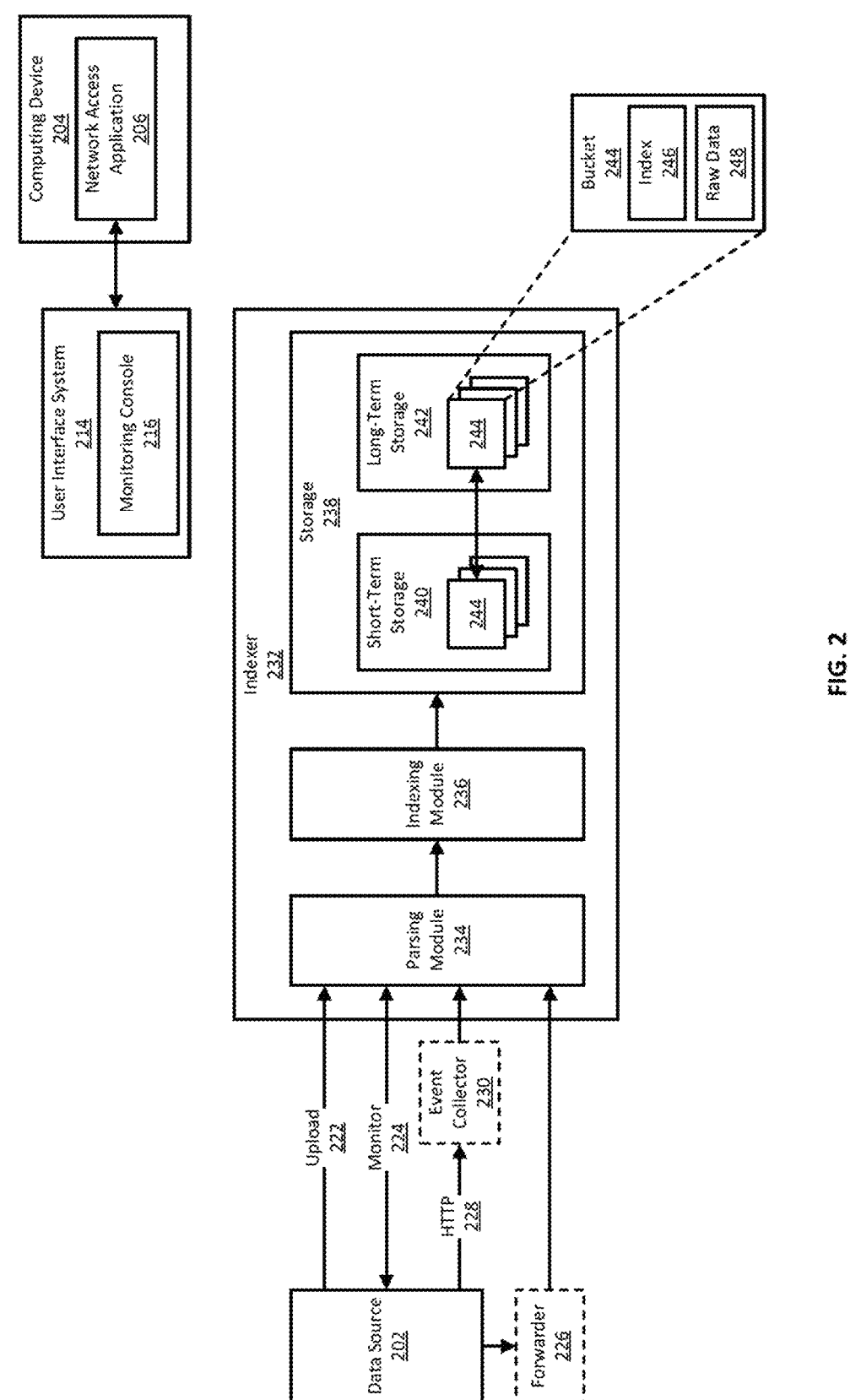
FIG. 2 is a block diagram of an example indexing system, in accordance with example embodiments.

FIG. 2 is a block diagram illustrating in greater detail an example of an indexing system 220 of a data intake and query system, such as the data intake and query system 110 of FIG. 1. The indexing system 220 of FIG. 2 uses various methods to obtain machine data from a data source 202 and stores the data in an index 246 of an indexer 232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 220 enables the data intake and query system to obtain the machine data produced by the data source 202 and to store the data for searching and retrieval.

Users can administer the operations of the indexing system 220 using a computing device 204 that can access the indexing system 220 through a user interface system 214 of the data intake and query system. For example, the computing device 204 can be executing a network access application 206, such as a web browser or a terminal, through which a user can access a monitoring console 216 provided by the user interface system 214. The monitoring console 216 can enable operations such as: identifying the data source 202 for data ingestion; configuring the indexer 232 to index the data from the data source 202; configuring a data ingestion method; configuring, deploying, and managing clusters of indexers; and viewing the topology and performance of a deployment of the data intake and query system, among other operations. The operations performed by the indexing system 220 may be referred to as "index time" operations, which are distinct from "search time" operations that are discussed further below.

The indexer 232, which may be referred to herein as a data indexing component, coordinates and performs most of the index time operations. The indexer 232 can be implemented using program code that can be executed on a computing device. The program code for the indexer 232 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 232. In some implementations, the indexer 232 executes on the computing device 204 through which a user can access the indexing system 220. In some implementations, the indexer 232 executes on a different computing device than the illustrated computing device 204.

The indexer 232 may be executing on the computing device that also provides the data source 202 or may be executing on a different computing device. In implementations wherein the indexer 232 is on the same computing device as the data source 202, the data produced by the data source 202 may be referred to as "local data." In other implementations the data source 202 is a component of a first computing device and the indexer 232 executes on a second computing device that is different from the first computing device. In these implementations, the data produced by the data source 202 may be referred to as "remote data." In some implementations, the first computing device is "on-prem" and in some implementations the first computing device is "in the cloud." In some implementations, the indexer 232 executes on a computing device in the cloud and the operations of the indexer 232 are provided as a service to entities that subscribe to the services provided by the data intake and query system.

For a given data produced by the data source 202, the indexing system 220 can be configured to use one of several methods to ingest the data into the indexer 232. These methods include upload 222, monitor 224, using a forwarder 226, or using HyperText Transfer Protocol (HTTP 228) and an event collector 230. These and other methods for data ingestion may be referred to as "getting data in" (GDI) methods.

Using the upload 222 method, a user can specify a file for uploading into the indexer 232. For example, the monitoring console 216 can include commands or an interface through which the user can specify where the file is located (e.g., on which computing device and/or in which directory of a file system) and the name of the file. The file may be located at the data source 202 or maybe on the computing device where the indexer 232 is executing. Once uploading is initiated, the indexer 232 processes the file, as discussed further below. Uploading is a manual process and occurs when instigated by a user. For automated data ingestion, the other ingestion methods are used.

The monitor 224 method enables the indexing system to monitor the data source 202 and continuously or periodically obtain data produced by the data source 202 for ingestion by the indexer 232. For example, using the monitoring console 216, a user can specify a file or directory for monitoring. In this example, the indexing system can execute a monitoring process that detects whenever the file or directory is modified and causes the file or directory contents to be sent to the indexer 232. As another example, a user can specify a network port for monitoring. In this example, a monitoring process can capture data received at or transmitting from the network port and cause the data to be sent to the indexer 232. In various examples, monitoring can also be configured for data sources such as operating system event logs, performance data generated by an operating system, operating system registries, operating system directory services, and other data sources.

Monitoring is available when the data source 202 is local to the indexer 232 (e.g., the data source 202 is on the computing device where the indexer 232 is executing). Other data ingestion methods, including forwarding and the event collector 230, can be used for either local or remote data sources.

A forwarder 226, which may be referred to herein as a data forwarding component, is a software process that sends data from the data source 202 to the indexer 232. The forwarder 226 can be implemented using program code that can be executed on the computer device that provides the data source 202. A user launches the program code for the forwarder 226 on the computing device that provides the data source 202. The user can further configure the forwarder 226, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 226 can provide various capabilities. For example, the forwarder 226 can send the data unprocessed or can perform minimal processing on the data before sending the data to the indexer 232. Minimal processing can include, for example, adding metadata tags to the data to identify a source, source type, and/or host, among other information, dividing the data into blocks, and/or applying a timestamp to the data. In some implementations, the forwarder 226 can break the data into individual events (event generation is discussed further below) and send the events to a receiver. Other operations that the forwarder 226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 230 provides an alternate method for obtaining data from the data source 202. The event collector 230 enables data and application events to be sent to the indexer 232 using HTTP 228. The event collector 230 can be implemented using program code that can be executing on a computing device. The program code may be a component of the data intake and query system or can be a standalone component that can be executed independently of the data intake and query system and operates in cooperation with the data intake and query system.

To use the event collector 230, a user can, for example using the monitoring console 216 or a similar interface provided by the user interface system 214, enable the event collector 230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 202 as an alternative method to using a username and password for authentication.

To send data to the event collector 230, the data source 202 is supplied with a token and can then send HTTP 228 requests to the event collector 230. To send HTTP 228 requests, the data source 202 can be configured to use an HTTP client and/or to use logging libraries such as those supplied by Java, JavaScript, and .NET libraries. An HTTP client enables the data source 202 to send data to the event collector 230 by supplying the data, and a Uniform Resource Identifier (URI) for the event collector 230 to the HTTP client. The HTTP client then handles establishing a connection with the event collector 230, transmitting a request containing the data, closing the connection, and receiving an acknowledgment if the event collector 230 sends one. Logging libraries enable HTTP 228 requests to the event collector 230 to be generated directly by the data source. For example, an application can include or link a logging library, and through functionality provided by the logging library manage establishing a connection with the event collector 230, transmitting a request, and receiving an acknowledgement.

An HTTP 228 request to the event collector 230 can contain a token, a channel identifier, event metadata, and/or event data. The token authenticates the request with the event collector 230. The channel identifier, if available in the indexing system 220, enables the event collector 230 to segregate and keep separate data from different data sources. The event metadata can include one or more key-value pairs that describe the data source 202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 230 extracts events from HTTP 228 requests and sends the events to the indexer 232. The event collector 230 can further be configured to send events to one or more indexers. Extracting the events can include associating any metadata in a request with the event or events included in the request. In these implementations, event generation by the indexer 232 (discussed further below) is bypassed, and the indexer 232 moves the events directly to indexing. In some implementations, the event collector 230 extracts event data from a request and outputs the event data to the indexer 232, and the indexer generates events from the event data. In some implementations, the event collector 230 sends an acknowledgement message to the data source 202 to indicate that the event collector 230 has received a particular request form the data source 202, and/or to indicate to the data source 202 that events in the request have been indexed.

The indexer 232 ingests incoming data and transforms the data into searchable knowledge in the form of events. In the data intake and query system, an event is a single piece of data that represents activity of the component represented in FIG. 2 by the data source 202. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes generating an index (e.g., identifying keywords associated with the generated events) based on the generated events. As an example, the indexer 232 can include a parsing module 234 and an indexing module 236 for generating and storing the events. The parsing module 234 and indexing module 236 can be modular and pipelined, such that one component can be operating on a first set of data while the second component is simultaneously operating on a second sent of data. Additionally, the indexer 232 may at any time have multiple instances of the parsing module 234 and indexing module 236, with each set of instances configured to simultaneously operate on data from the same data source or from different data sources. The parsing module 234 and indexing module 236 are illustrated in FIG. 2 to facilitate discussion, with the understanding that implementations with other components are possible to achieve the same functionality.

The parsing module 234 determines information about incoming event data, where the information can be used to identify events within the event data. For example, the parsing module 234 can associate a source type with the event data. A source type identifies the data source 202 and describes a possible data structure of event data produced by the data source 202. For example, the source type can indicate which fields to expect in events generated at the data source 202 and the keys for the values in the fields, and possibly other information such as sizes of fields, an order of the fields, a field separator, and so on. The source type of the data source 202 can be specified when the data source 202 is configured as a source of event data. Alternatively, the parsing module 234 can determine the source type from the event data, for example from an event field in the event data or using machine learning techniques applied to the event data.

Other information that the parsing module 234 can determine includes timestamps. In some cases, an event includes a timestamp as a field, and the timestamp indicates a point in time when the action represented by the event occurred or was recorded by the data source 202 as event data. In these cases, the parsing module 234 may be able to determine from the source type associated with the event data that the timestamps can be extracted from the events themselves. In some cases, an event does not include a timestamp and the parsing module 234 determines a timestamp for the event, for example from a name associated with the event data from the data source 202 (e.g., a file name when the event data is in the form of a file) or a time associated with the event data (e.g., a file modification time). As another example, when the parsing module 234 is not able to determine a timestamp from the event data, the parsing module 234 may use the time at which it is indexing the event data. As another example, the parsing module 234 can use a user-configured rule to determine the timestamps to associate with events.

The parsing module 234 can further determine event boundaries. In some cases, a single line (e.g., a sequence of characters ending with a line termination) in event data represents one event while in other cases, a single line represents multiple events. In yet other cases, one event may span multiple lines within the event data. The parsing module 234 may be able to determine event boundaries from the source type associated with the event data, for example from a data structure indicated by the source type. In some implementations, a user can configure rules the parsing module 234 can use to identify event boundaries.

The parsing module 234 can further extract data from events and possibly also perform transformations on the events. For example, the parsing module 234 can extract a set of fields (key-value pairs) for each event, such as a host or hostname, source or source name, and/or source type. The parsing module 234 may extract certain fields by default or based on a user configuration. Alternatively or additionally, the parsing module 234 may add fields to events, such as a source type or a user-configured field. As another example of a transformation, the parsing module 234 can anonymize fields in events to mask sensitive information, such as social security numbers or account numbers. Anonymizing fields can include changing or replacing values of specific fields. The parsing module 234 can further perform user-configured transformations.

The parsing module 234 outputs the results of processing incoming event data to the indexing module 236, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 232 can be configured to identify searchable segments that are parts of fields, searchable segments that are entire fields, or both. The parsing module 234 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index 246 (e.g., an index file), to find event data that matches a search query. In some implementations, segmentation can alternatively be performed by the forwarder 226. Segmentation can also be disabled, in which case the indexer 232 will not build a lexicon for the event data. When segmentation is disabled, the search system searches the event data directly.

The storage 238 may be a storage data structure on a storage device (e.g., a disk drive or other physical device for storing digital data). The storage device may be a component of the computing device on which the indexer 232 is operating (referred to herein as local storage) or may be a component of a different computing device (referred to herein as remote storage) that the indexer 232 has access to over a network. The indexer 232 can manage more than one index and can manage indexes of different types. For example, the indexer 232 can manage event indexes, which impose minimal structure on stored data and can accommodate any type of data. As another example, the indexer 232 can manage metrics indexes, which use a highly structured format to handle the higher volume and lower latency demands associated with metrics data.

The indexing module 236 organizes files in the storage 238 in directories referred to as buckets. The files in a bucket 244 can include raw data files, indexes, and possibly also other metadata files. As used herein, "raw data" means data as when the data was produced by the data source 202, without alteration to the format or content. As noted previously, the parsing module 234 may add fields to event data and/or perform transformations on fields in the event data. Event data that has been altered in this way is referred to herein as enriched data. A raw data file 248 can include enriched data, in addition to or instead of raw data. The raw data file 248 may be compressed to reduce disk usage. An index 246, which may also be referred to herein as a "time-series index" or tsidx file, contains metadata that the indexer 232 can use to search a corresponding raw data file 248. As noted above, the metadata in the index 246 includes a lexicon of the event data, which associates each unique keyword in the event data with a reference to the location of event data within the raw data file 248. The keyword data in the index 246 may also be referred to as an inverted index. In various implementations, the data intake and query system can use indexes for other purposes, such as to store data summarizations that can be used to accelerate searches.

A bucket 244 includes event data for a particular range of time. The indexing module 236 arranges buckets in the storage 238 according to the age of the buckets, such that buckets for more recent ranges of time are stored in short-term storage 240 and buckets for less recent ranges of time are stored in long-term storage 242. Short-term storage 240 may be faster to access while long-term storage 242 may be slower to access. Buckets may be moves from short-term storage 240 to long-term storage 242 according to a configurable data retention policy, which can indicate at what point in time a bucket is old enough to be moved.

A bucket's location in short-term storage 240 or long-term storage 242 can also be indicated by the bucket's status. As an example, a bucket's status can be "hot," "warm," "cold," "frozen," or "thawed." In this example, hot bucket is one to which the indexer 232 is writing data and the bucket becomes a warm bucket when the indexer 232 stops writing data to it. In this example, both hot and warm buckets reside in short-term storage 240. Continuing this example, when a warm bucket is moved to long-term storage 242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 220 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 220 through the monitoring console 216 provided by the user interface system 214. Using the monitoring console 216, the user can configure and monitor an index cluster, and see information such as disk usage by an index, volume usage by an indexer, index and volume size over time, data age, statistics for bucket types, and bucket settings, among other information.

Figure 3:
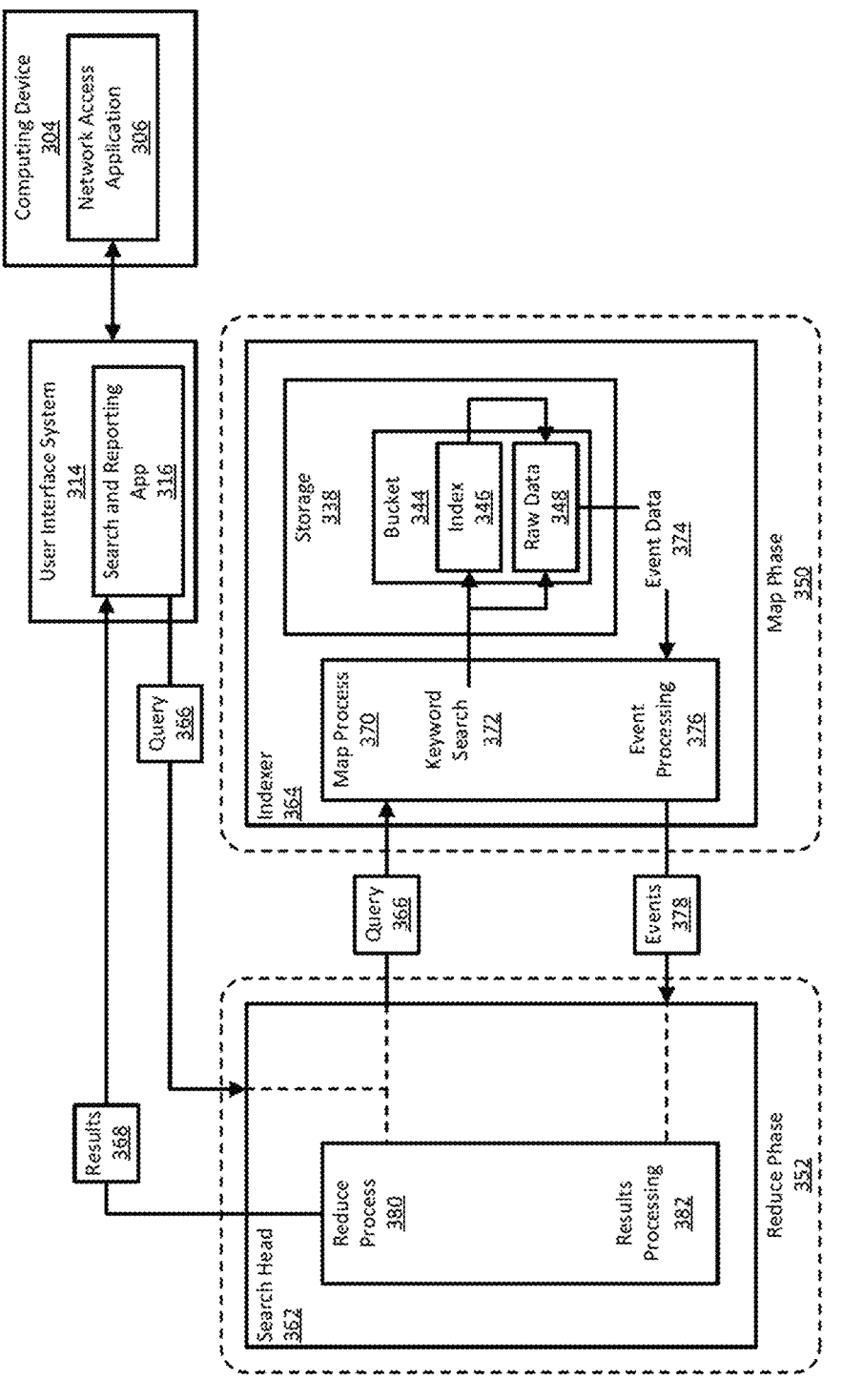
FIG. 3 is a block diagram of an example search system, in accordance with example embodiments.

FIG. 3 is a block diagram illustrating in greater detail an example of the search system 360 of a data intake and query system, such as the data intake and query system 110 of FIG. 1. The search system 360 of FIG. 3 issues a query 366 to a search head 362, which sends the query 366 to an indexer 364 (e.g., a search peer, a search node, etc.). Using a map process 370, the indexer 364 searches the appropriate storage 338 for events identified by the query 366 and sends events 378 so identified back to the search head 362. Using a reduce process 382, the search head 362 processes the events 378 and produces results 368 to respond to the query 366. The results 368 can provide useful insights about the data stored in the storage 338. These insights can aid in the administration of information technology systems, in security analysis of information technology systems, and/or in analysis of the development environment provided by information technology systems.

The query 366 that initiates a search is produced by a search and reporting app 316 that is available through the user interface system 314 of the data intake and query system. Using a network access application 306 executing on a computing device 304, a user can input the query 366 into a search field provided by the search and reporting app 316. Alternatively or additionally, the search and reporting app 316 can include pre-configured queries or stored queries that can be activated by the user. In some cases, the search and reporting app 316 initiates the query 366 when the user enters the query 366. In these cases, the query 366 maybe referred to as an "ad-hoc" query. In some cases, the search and reporting app 316 initiates the query 366 based on a schedule. For example, the search and reporting app 316 can be configured to execute the query 366 once per hour, once per day, at a specific time, on a specific date, or at some other time that can be specified by a date, time, and/or frequency. These types of queries maybe referred to as scheduled queries.

The query 366 is specified using a search processing language. The search processing language includes commands or search terms that the indexer 364 will use to identify events to return in the search results 368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 366 to include sequential commands, where a subsequent command may operate on the results of a prior command. As an example, sequential commands may be separated in the query 366 by a vertical line ("|" or "pipe") symbol.

In addition to one or more search commands, the query 366 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 366 occurs in two broad phases: a map phase 350 and a reduce phase 352. The map phase 350 takes place across one or more indexers. In the map phase 350, the indexers locate event data that matches the search terms in the search query 366 and sorts the event data into field-value pairs. When the map phase 350 is complete, the indexers send events that they have found to one or more search heads for the reduce phase 352. During the reduce phase 352, the search heads process the events through commands in the search query 366 and aggregate the events to produce the final search results 368.

A search head, such as the search head 362 illustrated in FIG. 3, is a component of the search system 360 that manages searches. The search head 362, which may also be referred to herein as a search management component, can be implemented using program code that can be executed on a computing device. The program code for the search head 362 can be stored on a non-transitory computer-readable medium and from this medium can be loaded or copied to the memory of a computing device. One or more hardware processors of the computing device can read the program code from the memory and execute the program code in order to implement the operations of the search head 362.

Upon receiving the search query 366, the search head 362 directs the query 366 to one or more indexers, such as the indexer 364 illustrated in FIG. 3. "Search peer" is an alternate name for "indexer" and a search peer may be largely similar to the indexer described previously. The indexer 364 may be referred to as a "peer node" when the indexer 364 is part of an indexer cluster. The indexer 364, which may also be referred to as a search execution component, can be implemented using program code that can be executed on a computing device. In some implementations, one set of program code implements both the search head 362 and the indexer 364 such that the search head 362 and the indexer 364 form one component. In some implementations, the search head 362 is an independent piece of code that performs searching and no indexing functionality. In these implementations, the search head 362 may be referred to as a dedicated search head.

The search head 362 may consider multiple criteria when determining whether to send the query 366 to the particular indexer 364. For example, the search system 360 may be configured to include multiple indexers that each have duplicative copies of at least some of the event data and are implanted using different hardware resources. In this example, the sending the search query 366 to more than one indexer allows the search system 360 to distribute the search workload across different hardware resources. As another example, search system 360 may include different indexers for different purposes (e.g., one has an index storing a first type of data or from a first data source while a second has an index storing a second type of data or from a second data source). In this example, the search query 366 may specify which indexes to search, and the search head 362 will send the query 366 to the indexers that have those indexes.

To identify events 378 to send back to the search head 362, the indexer 364 performs a map process 370 to obtain event data 374 from the storage 338 that is maintained by the indexer 364. During a first phase of the map process 370, the indexer 364 identifies buckets that have events that are described by the time indicator in the search query 366. As noted above, a bucket contains events whose timestamps fall within a particular range of time. For each bucket 344 whose events can be described by the time indicator, during a second phase of the map process 370, the indexer 364 performs a keyword search 372 using search terms specified in the search query 366. The search terms can be one or more of keywords, phrases, fields, Boolean expressions, and/or comparison expressions that in combination describe events being searched for. When segmentation is enabled at index time, the indexer 364 performs the keyword search 372 on the bucket's index 346. As noted previously, the index 346 includes a lexicon of the searchable terms in the events stored in the bucket's raw data 348 file. The keyword search 372 searches the lexicon for searchable terms that correspond to one or more of the search terms in the query 366. As also noted above, the lexicon incudes, for each searchable term, a reference to each location in the raw data 348 file where the searchable term can be found. Thus, when the keyword search identifies a searchable term in the index 346 that matches a search term in the query 366, the indexer 364 can use the location references to extract from the raw data 348 file the event data 374 for each event that include the searchable term.

In cases where segmentation was disabled at index time, the indexer 364 performs the keyword search 372 directly on the raw data 348 file. To search the raw data 348, the indexer 364 may identify searchable segments in events in a similar manner as when the data was indexed. Thus, depending on how the indexer 364 is configured, the indexer 364 may look at event fields and/or parts of event fields to determine whether an event matches the query 366. Any matching events can be added to the event data 374 read from the raw data 348 file. The indexer 364 can further be configured to enable segmentation at search time, so that searching of the storage 338 causes the indexer 364 to build a lexicon in the index 346.

The event data 374 obtained from the raw data 348 file includes the full text of each event found by the keyword search 372. During a third phase of the map process 370, the indexer 364 performs event processing 376 on the event data 374, with the steps performed being determined by the configuration of the indexer 364 and/or commands in the search query 366. For example, the indexer 364 can be configured to perform field discovery and field extraction. Field discovery is a process by which the indexer 364 identifies and extracts key-value pairs from the events in the event data 374. The indexer 364 can, for example, be configured to automatically extract the first 100 fields (or another number of fields) in the event data 374 that can be identified as key-value pairs. As another example, the indexer 364 can extract any fields explicitly mentioned in the search query 366. The indexer 364 can, alternatively or additionally, be configured with particular field extractions to perform.

Other examples of steps that can be performed during event processing 376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The indexer 364 sends processed events 378 to the search head 362, which performs a reduce process 380. The reduce process 380 potentially receives events from multiple indexers and performs various results processing 382 steps on the received events. The results processing 382 steps can include, for example, aggregating the events received from different indexers into a single set of events, deduplicating and aggregating fields discovered by different indexers, counting the number of events found, and sorting the events by timestamp (e.g., newest first or oldest first), among other examples. Results processing 382 can further include applying commands from the search query 366 to the events. The query 366 can include, for example, commands for evaluating and/or manipulating fields (e.g., to generate new fields from existing fields or parse fields that have more than one value). As another example, the query 366 can include commands for calculating statistics over the events, such as counts of the occurrences of fields, or sums, averages, ranges, and so on, of field values. As another example, the query 366 can include commands for generating statistical values for purposes of generating charts of graphs of the events.

The reduce process 380 outputs the events found by the search query 366, as well as information about the events. The search head 362 transmits the events and the information about the events as search results 368, which are received by the search and reporting app 316. The search and reporting app 316 can generate visual interfaces for viewing the search results 368. The search and reporting app 316 can, for example, output visual interfaces for the network access application 306 running on a computing device 304 to generate.

The visual interfaces can include various visualizations of the search results 368, such as tables, line or area charts, Chloropleth maps, or single values. The search and reporting app 316 can organize the visualizations into a dashboard, where the dashboard includes a panel for each visualization. A dashboard can thus include, for example, a panel listing the raw event data for the events in the search results 368, a panel listing fields extracted at index time and/or found through field discovery along with statistics for those fields, and/or a timeline chart indicating how many events occurred at specific points in time (as indicated by the timestamps associated with each event). In various implementations, the search and reporting app 316 can provide one or more default dashboards. Alternatively or additionally, the search and reporting app 316 can include functionality that enables a user to configure custom dashboards.

The search and reporting app 316 can also enable further investigation into the events in the search results 368. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 4:
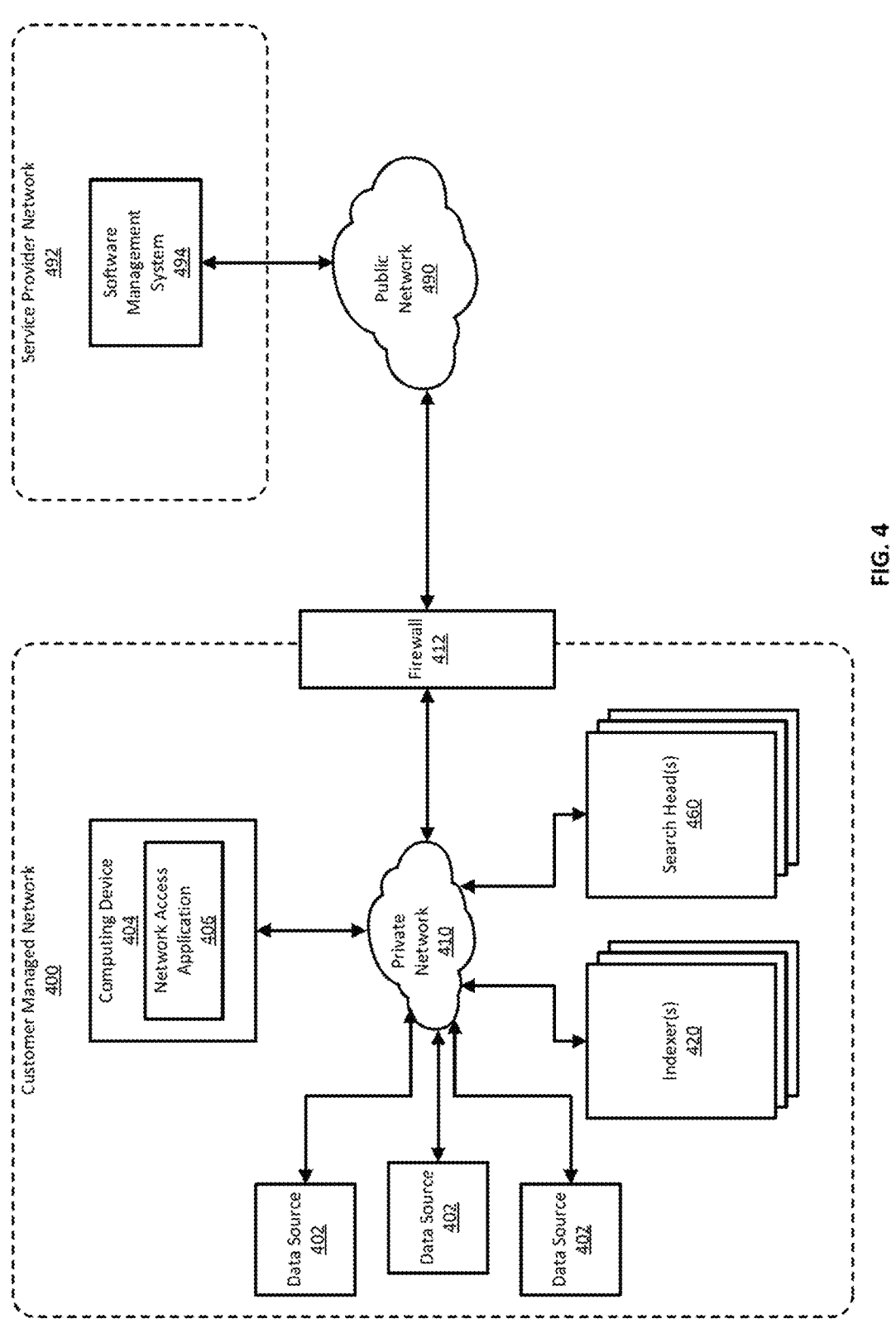
FIG. 4 is a block diagram of an example self-managed network, in accordance with example embodiments.

FIG. 4 illustrates an example of a self-managed network 400 that includes a data intake and query system. "Self-managed" in this instance means that the entity that is operating the self-managed network 400 configures, administers, maintains, and/or operates the data intake and query system using its own compute resources and people. Further, the self-managed network 400 of this example is part of the entity's on-premise network and includes a set of compute, memory, and networking resources that are located, for example, within the confines of an entity's data center. These resources can include software and hardware resources. The entity can, for example, be a company or enterprise, a school, government entity, or other entity. Since the self-managed network 400 is located within the customer's on-prem environment, such as in the entity's data center, the operation and management of the self-managed network 400, including of the resources in the self-managed network 400, is under the control of the entity. For example, administrative personnel of the entity have complete access to and control over the configuration, management, and security of the self-managed network 400 and its resources.

The self-managed network 400 can execute one or more instances of the data intake and query system. An instance of the data intake and query system may be executed by one or more computing devices that are part of the self-managed network 400. A data intake and query system instance can include an indexing system and a search system, where the indexing system includes one or more indexers 420 and the search system includes one or more search heads 460.

As depicted in FIG. 4, the self-managed network 400 can include one or more data sources 402. Data received from these data sources may be processed by an instance of the data intake and query system within self-managed network 400. The data sources 402 and the data intake and query system instance can be communicatively coupled to each other via a private network 410.

Users associated with the entity can interact with and avail themselves of the functions performed by a data intake and query system instance using computing devices. As depicted in FIG. 4, a computing device 404 can execute a network access application 406 (e.g., a web browser), that can communicate with the data intake and query system instance and with data sources 402 via the private network 410. Using the computing device 404, a user can perform various operations with respect to the data intake and query system, such as management and administration of the data intake and query system, generation of knowledge objects, and other functions. Results generated from processing performed by the data intake and query system instance may be communicated to the computing device 404 and output to the user via an output system (e.g., a screen) of the computing device 404.

The self-managed network 400 can also be connected to other networks that are outside the entity's on-premise environment/network, such as networks outside the entity's data center. Connectivity to these other external networks is controlled and regulated through one or more layers of security provided by the self-managed network 400. One or more of these security layers can be implemented using firewalls 412. The firewalls 412 form a layer of security around the self-managed network 400 and regulate the transmission of traffic from the self-managed network 400 to the other networks and from these other networks to the self-managed network 400.

Networks external to the self-managed network can include various types of networks including public networks 490, other private networks, and/or cloud networks provided by one or more cloud service providers. An example of a public network 490 is the Internet. In the example depicted in FIG. 4, the self-managed network 400 is connected to a service provider network 492 provided by a cloud service provider via the public network 490.

In some implementations, resources provided by a cloud service provider may be used to facilitate the configuration and management of resources within the self-managed network 400. For example, configuration and management of a data intake and query system instance in the self-managed network 400 may be facilitated by a software management system 494 operating in the service provider network 492. There are various ways in which the software management system 494 can facilitate the configuration and management of a data intake and query system instance within the self-managed network 400. As one example, the software management system 494 may facilitate the download of software including software updates for the data intake and query system. In this example, the software management system 494 may store information indicative of the versions of the various data intake and query system instances present in the self-managed network 400. When a software patch or upgrade is available for an instance, the software management system 494 may inform the self-managed network 400 of the patch or upgrade. This can be done via messages communicated from the software management system 494 to the self-managed network 400.

The software management system 494 may also provide simplified ways for the patches and/or upgrades to be downloaded and applied to the self-managed network 400. For example, a message communicated from the software management system 494 to the self-managed network 400 regarding a software upgrade may include a Uniform Resource Identifier (URI) that can be used by a system administrator of the self-managed network 400 to download the upgrade to the self-managed network 400. In this manner, management resources provided by a cloud service provider using the service provider network 492 and which are located outside the self-managed network 400 can be used to facilitate the configuration and management of one or more resources within the entity's on-prem environment. In some implementations, the download of the upgrades and patches may be automated, whereby the software management system 494 is authorized to, upon determining that a patch is applicable to a data intake and query system instance inside the self-managed network 400, automatically communicate the upgrade or patch to self-managed network 400 and cause it to be installed within self-managed network 400.

2.0. Query Execution Via Data Processing Systems Overview

A query coordinator (which may also be referred to herein as a data orchestrator) may facilitate execution of queries across multiple systems. For example, the query coordinator can facilitate execution of a query across a first data processing system (e.g., a first distributed data processing system) and a second data processing system (e.g., a second distributed data processing system). To facilitate execution of the query, the query coordinator can route the query (e.g., respective portions of the query) to multiple data processing systems.

In some cases, the query coordinator can generate a query processing scheme for execution of the query. For example, the query coordinator may resolve (e.g., define, convert, translate, etc.) a portion of the query to generate the query processing scheme using a library that indicates how to resolve the query. In another example, the query coordinator may convert or translate a query from a first query language (e.g., interpretable by a first data processing system) to a second query language (e.g., interpretable by a second data processing system).

The query coordinator may route the generated query processing scheme (e.g., for execution of the query) to a data processing system (e.g., the second data processing system). For example, the query coordinator may receive a query and may facilitate execution of the query by converting or translating the query into a query language interpretable by a particular data processing system.

Such a system may prove unsatisfactory where the library (e.g., indicating how to resolve the query) may be dynamic (e.g., may be updated in real time). For example, such a system may prove unsatisfactory where the library, based on one or more updates, may indicate that one or more first commands, operators, functions, expressions, data, etc. are resolved in a first manner (e.g., are translated to one or more second commands, operators, functions, expressions, data, etc.) and subsequently (e.g., during a subsequent time period) indicates that the one or more first commands, operators, functions, expressions, data, etc. are resolved in a second manner (e.g., are translated to one or more third commands, operators, functions, expressions, data, etc.). Execution of such a query by the data processing system may result in inefficient or ineffective query execution.

Such a system may result in a data processing system executing a query for which the data processing system is not equipped to execute (e.g., execution of at least a portion of the query by the data processing system may not satisfy one or more query parameters). For example, a query parameter may indicate that, to execute at least a portion of a query, the data processing system should be capable of executing the at least a portion of the query (e.g., the data processing system should be capable of resolving one or more commands, operators, functions, expressions, data, etc. associated with the query). Execution of such a portion of a query that the data processing system is not capable of resolving (e.g., cannot understand, translate, execute, etc.) may result in output of a null data set, an output of an error, an incomplete query execution, etc. For example, a particular command within the query (e.g., StreamStats, TimeChart, etc.) may not be mapped to an operation that the data processing system can execute such that execution of the query by the data processing system may cause the data processing system to output an error.

In another example, a query parameter may indicate that execution of at least a portion of the query by the data processing system should result in an execution time (e.g., query execution time), a translation time (e.g., a query translation time), and/or a resource utilization that satisfies (e.g., is less than, matches, is within, etc.) a threshold (e.g., a threshold value, a threshold range, etc.). Execution of such a query by the data processing system that results in an execution time, a translation time, and/or a resource utilization that does not satisfy (e.g., is greater than, matches, is outside of, etc.) a threshold may result in inefficient or ineffective query execution.

In another example, a query parameter may indicate that the data processing system should be capable of processing (e.g., is trained to process, processing satisfies a threshold, etc.) data associated with the query having a particular data type (e.g., including a particular data structure.). Execution of such a query associated with data that the data processing system is not capable of processing may result in an inefficient query execution. In some cases, execution of such a query may result in an inadequate user experience as the query results provided by data processing systems may be incomplete and/or may not be responsive to a request by a user.

Further, such a system may prove unsatisfactory where multiple components of multiple data processing systems can execute at least a portion of the query and/or access the same data for execution of at least a portion of the query. For example, such a system may prove unsatisfactory where multiple components of a first data processing system and/or a second data processing system are able to retrieve the (same) data from the (same) data sources and/or execute at least a portion of the query. Such a system may not dynamically assign at least a portion of the query based on the query parameters. Instead, such a system may resolve a query and provide the query to a data processing system without identifying how to distribute the query among the multiple data processing systems that can each access the same data. Such a system may be limited to resolving a query for execution of the query by a first data processing system while it may be more efficient for a second data processing system to execute the query. This can lead to a loss in efficiency which may be undesirable as it can lead to longer search times and/or the inability to execute certain queries.

Thus, by executing queries in such a manner (e.g., by a data processing system), the system may experience a longer search time and/or an inability to execute certain queries. This may cause inadequate performance.

To address these issues, embodiments of the present disclosure relate to a system that includes a query coordinator that can receive a query, identify (e.g., dynamically assign) a data processing system (e.g., the first data processing system, the second data processing system, a component of the first data processing system such as a search head, an indexer, etc., a component of the second data processing system, etc.) to execute a portion of the query, identify a scheme generator based on identifying the data processing system, and communicate the portion of the query to the scheme generator for generation of a query processing scheme. Additionally, the query coordinator can obtain a query processing scheme (e.g., a distributed query execution plan, a Connect Plan, etc.) from the scheme generator and can route the query processing scheme to a server associated with the identified data processing system for execution of the portion of the query.

The query coordinator can receive and process the query to identify data associated with the query. The query coordinator can identify components and/or data processing systems (e.g., the first data processing system, the second data processing system, etc.) that can access the data (e.g., a same copy, version, etc. of the data at a particular data store) for execution of the query (e.g., the query identifying the data and a manner of processing the data). Accordingly, the query coordinator can dynamically assign a portion of the query to any of the components and/or the data processing systems for execution.

In some cases, the query coordinator may identify a portion of the query for execution by at least one of the identified components and/or data processing systems based on receiving and processing the first query. For example, the query coordinator can identify a first portion of the first query, a second portion of the first query, etc.

Based on identifying the data processing system (e.g., assigning the data processing system to execute a respective portion of the query), the query coordinator can identify a scheme generator (e.g., a plan generator) for generation of a query processing scheme for execution of a portion of the query. For example, the query coordinator can identify a scheme generator associated with the data processing system. In another example, the query coordinator can identify a scheme generator associated with the particular runtime (e.g., version, software, framework, platform, etc.) of the data processing system.

In some cases, the query coordinator may be associated with a plurality of scheme generators and all or a portion of the plurality of scheme generators may be associated with a respective data processing system of a plurality of data processing systems. For example, a first scheme generator may be associated with a first data processing system, a second scheme generator may be associated with a second data processing system, etc.

The query coordinator (e.g., using a query driver) can route (e.g., communicate) a portion of the query to the scheme generator. In some cases, the query coordinator may provide instructions to the scheme generator indicating how to generate the query processing scheme.

Based on receiving the portion of the query from the query coordinator, the scheme generator can resolve the portion of the query and generate a query processing scheme. For example, the scheme generator can define, convert, translate, etc. the portion of the query to generate the query processing scheme using a library that indicates how to resolve the query (e.g., the library may indicate a mapping of one or more first commands, operators, functions, expressions, data, etc. to one or more second commands, operators, functions, expressions, data, etc.). The query coordinator (e.g., using the query driver) can obtain the query processing scheme from the scheme generator.

Based on identifying the data processing system (e.g., assigning the data processing system to execute a respective portion of the query), the query coordinator can identify a server associated with the data processing system (e.g., a server of the query coordinator where the server is co-located with the data processing system) to receive the query processing scheme for execution of the portion of the query. In some cases, the query coordinator may include a plurality of servers and all or a portion of the plurality of servers may be associated with a respective data processing system of a plurality of data processing systems. For example, a first server may be associated with a first data processing system, a second server may be associated with a second data processing system, etc. In some cases, the query coordinator may be associated with a plurality of servers and all or a portion of the plurality of servers may be associated with a respective runtime of a respective data processing system of a plurality of data processing systems. For example, a first server may be associated with a first runtime of a data processing system, a second server may be associated with a second runtime of the data processing system, etc.

The query processing scheme may indicate resolution of at least a portion of the query processing scheme occurs using the server (e.g., via the library). In some cases, the query processing scheme may indicate resolution of a first portion of the query processing scheme occurs using the server and resolution of a second portion of the query processing scheme occurs using the data processing system.

The query coordinator may route the query processing scheme to the identified server. The server may route the query processing scheme to the data processing system (e.g., the identified data processing system). The server may resolve at least a portion of the query processing scheme for the data processing system using the library as the data processing system generates a query plan (e.g., a physical query execution plan, a Catalyst Plan, etc.) for execution of the portion of the query based on the query processing scheme. The data processing system may use the query plan to execute the portion of the query using a plurality of worker nodes of the data processing system.

As such, the described query coordinator enables the efficient execution of queries as compared to other approaches. For example, the query coordinator can initiate the execution of queries across multiple data processing systems using a dynamic library in an efficient manner based on a defined query processing scheme. As data processing systems may not resolve particular portions of the query, the routing of particular portions of the query to the server for resolution of the particular portions of the query by the server using the dynamic library may not impact (e.g., increase) a time period for execution of the search process.

2.1. Architecture For Query Execution

As described herein, a query coordinator can obtain a query and route the query (e.g., a portion of the query) to a scheme generator to define a query processing scheme. In some cases, the query coordinator may identify a first portion of the query to be executed by a first data processing system and a second portion of the query to be executed by a second data processing system and can route the second portion of the query to the scheme generator to define a query processing scheme for execution of the second portion of the query.

The techniques described below can enable the execution of a query using multiple data processing systems that may utilize different query languages, may execute queries according to different data semantics, may be optimized for execution of queries on different data (e.g., batch data v. streaming data, structured data v. unstructured data, etc.). For example, a first query language may be interpretable by a first data processing system which may use first data semantics to execute queries, and a second query language may be interpretable by a second data processing system which may use second data semantics to execute queries.

The techniques described below can further enable execution of a query by a data processing system using a query processing scheme where a portion of the query processing scheme is not interpretable by the data processing system. For example, the data processing system may be unable to resolve the portion of the query processing scheme. Instead, the data processing system may communicate with a server of the query coordinator to resolve the portion of the query processing scheme.

The query coordinator can facilitate execution of the query using the multiple data processing systems by identifying a first data processing system to execute a first portion of the query and a second data processing system to execute a second portion of the query. For a given portion of the query, the query coordinator can provide the portion of the query to a scheme generator. The scheme generator can, using a dynamic library, define a query processing scheme for execution of the portion of the query by the associated data processing system. The data processing system can receive the query processing scheme and resolve the query processing scheme by communicating with a server that can resolve at least a portion of the query processing scheme using the dynamic library. These techniques solve challenges of existing data processing systems in that these systems may enable data processing systems to execute queries based on query processing schemes that the data processing systems may be unable to resolve.

As the number of diverse data processing systems (e.g., with different capabilities, different optimizations, etc.) increases, it may be beneficial for the system to dynamically identify and dynamically assign particular portions of a query to different data processing systems regardless of whether the data processing systems can resolve a particular portion of the associated query processing scheme, especially where multiple data processing systems may be configured to access the data that is the subject of the query.

Figure 5:
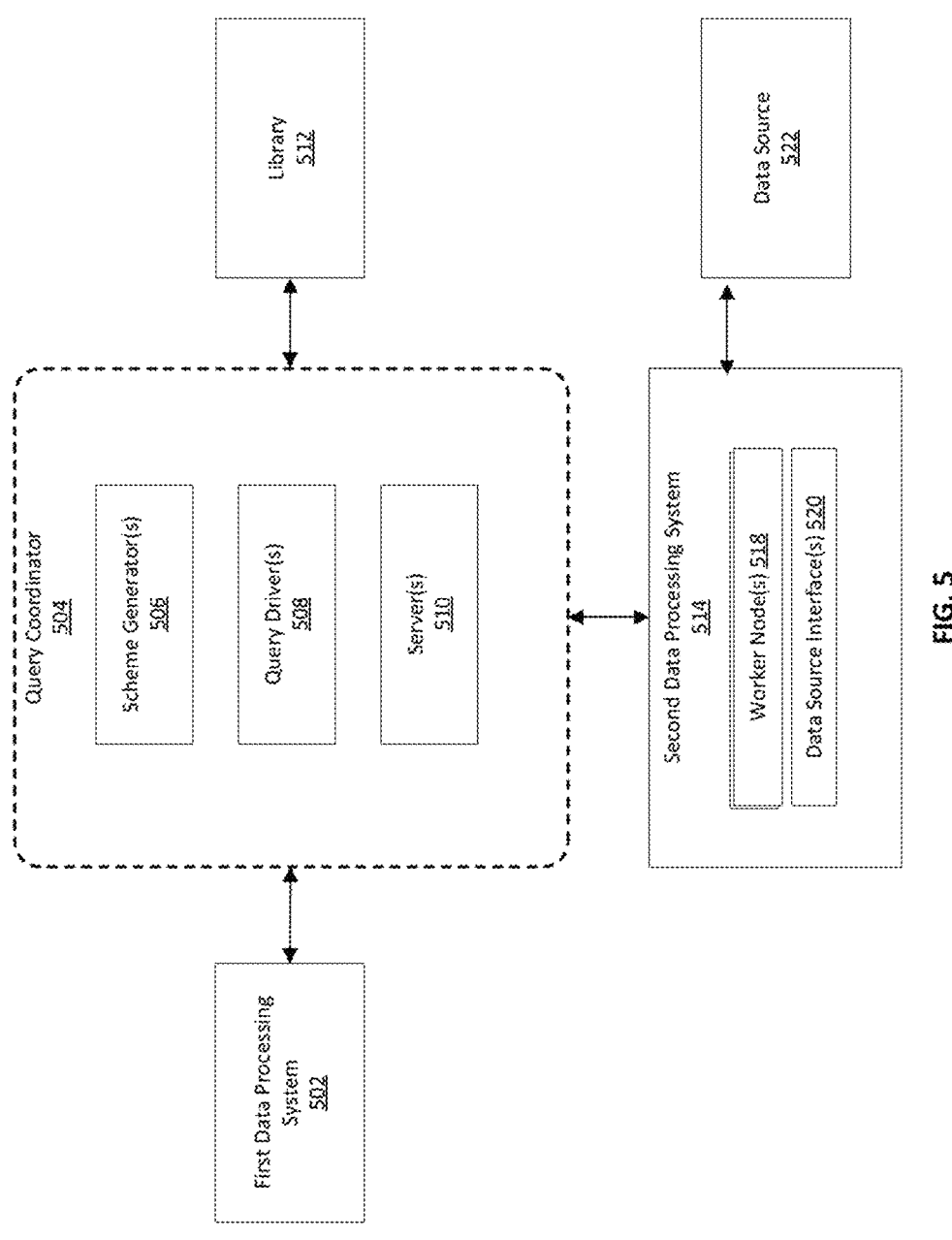
FIG. 5 is a block diagram of an example data processing system for execution of a query based on a dynamic library, in accordance with example embodiments.

FIG. 5 is an example of a data processing environment 500. Specifically, FIG. 5 illustrates an example environment 500 that includes a first data processing system 502, a query coordinator 504, a second data processing system 514, a library 512 (e.g., a catalog, a data catalog, etc.), and a data source 522. It will be understood that the elements illustrated in FIG. 5 are for illustrative purposes only and that the environment 500 can include fewer, more, and/or different elements. In some cases, the environment 500 may include multiple data sources, multiple libraries, multiple second data processing systems, multiple query coordinators, and/or multiple first data processing systems.

In some cases, the environment 500 may include a client device to enable definition of a query and/or display of results of execution of the query. The client device may be similar to and/or may include the computing device 104 as discussed with respect to FIG. 1. One or more applications may run on the client device. For example, the one or more applications may include an application to enable definition and provision of a query to the query coordinator 504. As described herein, in some cases, the client device may include a user interface system (e.g., to enable definition of the first query and/or to display query results).

The first data processing system 502 and/or the second data processing system 514 may include any data processing system. In some cases, the first data processing system 502 and/or the second data processing system 514 may be associated with different entities. For example, the second data processing system 514 may include any data processing system that may be designed, created, implemented, published, or otherwise made available from an entity that differs from an entity that designed, created, implemented, published, or otherwise made available to the first data processing system 502.

In some cases, the first data processing system 502 may be or may include one or more search heads, one or more indexers, one or more forwarders, one or more query coordinators, one or more worker nodes. In one example, the first data processing system 502 may be or may include a data intake and query system. FIGS. 1, 2, and 3 illustrate an example architecture of the first data processing system 502.

In certain cases, the second data processing system 514 may include one or more components (e.g., one or more worker node(s) 518) and may further include or interface with one or more data source interface(s) 520.

The one or more data source interface(s) 520 may be implemented as a network interface and may enable the second data processing system 514 to interface with (e.g., access) one or more data sources (e.g., data source 522). For example, the one or more data source interface(s) 520 may define one or more data streams, filters, pipelines, data routes, etc. between the second data processing system 514 and the one or more data sources. It should be understood that the second data processing system 514 may include one or more data source interface(s) 520 to interface with the data source 522 and/or to communicate with multiple data sources.

The data source 522 may be similar to and/or may include the data source 202 and/or the long-term storage 242 as discussed with reference to FIG. 2, or may be implemented as a data store configured to store machine data or other types of data in one or more formats. The data source 522 may form part of the first data processing system 502 and/or the second data processing system 514, or may be a distinct source of data for consumption by the first data processing system 502 and/or the second data processing system 514, etc. All or a portion of the first data processing system 502 and/or the second data processing system 514 may access the same data (e.g., a same copy or version of the data) as provided by and/or as stored at the data source 522. In some cases, the query coordinator 504 may access the same data as the data source 522. As discussed herein, the data source 522 may include data files, directories of files, data sent over a network, event logs, registries, raw machine data, etc.

The first data processing system 502 and the second data processing system 514 may utilize particular query languages, command languages, interface languages, etc. (e.g., different query languages, command languages, interface languages, etc.). For example, a first query language may be interpretable by the first data processing system 502 and a second query language may be interpretable by the second data processing system 514. In some cases, the first data processing system 502 may be a SPLUNK® system that is configured to use SPL and the second data processing system 514 may be a third-party data processing system (e.g., a third-party data processing system relative to the first data processing system 502) that is configured to use SPL2 SQL.

The query coordinator 504 may be implemented on a separate computing device or system from the first data processing system 502 and the second data processing system 514. In some cases, the query coordinator 504 may be related to or associated with the first data processing system 502. For example, the query coordinator 504 may be provided by the same company that provides the first data processing system and/or may use the same query language as the first data processing system 502. In certain cases, the query coordinator 504 may be a component of (e.g., may be implemented by) the first data processing system 502, the second data processing system 514, a third data processing system, etc. In some embodiments, the query coordinator 504 may be implemented on a separate computing device or system from the first data processing system 502 and the second data processing system 514. In some cases, the query coordinator 504 may be implemented separate from and/or located remotely from the first data processing system 502 and the second data processing system 514.

The library 512 (e.g., a dynamic library) may be and/or may include a library (e.g., a catalog) of query resolutions. For example, the library 512 may include and/or may indicate a manner of resolving a portion of a query (e.g., a manner of performing an operation, a manner of interpreting an operation, etc.), expression compensations (e.g., mapping a portion of a query in a first query language to a portion of a query in a second query language), expression definitions (e.g., defining a portion of a query), a catalog of query parameters, a catalog of metadata associated with a query and/or entity, a catalog of query transformations (e.g., field transformations), etc. For example, the query coordinator 504 may store the manner of resolving a portion of a query, the expression compensations, the expression definitions, the catalog of query parameters, the catalog of metadata associated with a query and/or entity, the catalog of query transformations, etc. in the library 512. In some cases, the query coordinator 504 may store the manner of resolving a portion of a query, the expression compensations, the expression definitions, the catalog of query parameters, the catalog of metadata associated with a query and/or entity, the catalog of query transformations, etc. in separate libraries.

In some cases, the query coordinator 504 may update (e.g., periodically, aperiodically, dynamically, etc.) the library 512 (e.g., in real time). For example, the query coordinator 504 may update the library 512 to update a definition of an expression.

In the example of FIG. 5, the query coordinator 504 includes one or more scheme generator(s) 506, one or more query driver(s) 508, and one or more server(s) 510. In some cases, the one or more scheme generator(s) 506, one or more query driver(s) 508, and one or more server(s) 510 may be data processing system specific. For example, the query coordinator 504 may include a respective scheme generator, query driver, and/or server for all or a portion of a plurality of data processing systems (e.g., the respective scheme generator, query driver, and/or server may be assigned to a respective data processing system). In some cases, a respective scheme generator, query driver, and/or server may be co-located with the data processing system assigned to the respective scheme generator, query driver, and/or server. For example, a server may be located with the data processing system assigned to the server.

In some cases, the one or more scheme generator(s) 506 may include and/or may implement an expression compensation module, a query parameter module, a query preparation module, a metadata module, a query transformation module, and/or a data semantics module and may utilize the expression compensation module, the query parameter module, the query preparation module, the metadata module, query transformation module, and/or the data semantics module to generate query processing schemes and/or access, store data in, obtain data from, manage, update, etc. the library 512.

As described herein, the query coordinator 504 can receive a query via the one or more query driver(s) 508 and the query coordinator 504 (e.g., the one or more query driver(s) 508) can parse the query. In some embodiments, the query coordinator 504 can obtain the query from the first data processing system 502. In some cases, the query coordinator 504 can obtain metadata associated with the query and parse the metadata. For example, the metadata may indicate commands, functions, expression, data, etc. associated with the query, a data type associated with the query, capabilities (e.g., processing capabilities, data access capabilities, etc.) of a data processing system (e.g., the first data processing system 502, the second data processing system 514, etc.).

In some cases, to obtain the metadata, the query coordinator 504 can communicate with the second data processing system 514 and/or the first data processing system 502 to determine metadata associated with (e.g., the respective capabilities of) the second data processing system 514 and/or the first data processing system 502. In some cases, the query coordinator 504 may obtain metadata associated with one or more data processing systems from a particular data processing system and/or from the library 512. For example, the query coordinator 504 may obtain metadata associated with the first data processing system 502 from the second data processing system 514 (e.g., the second data processing system 514 may extract and/or obtain metadata from the first data processing system 502). In another example, the second data processing system 514 may extract and/or obtain metadata from and associated with the first data processing system 502 and may store the metadata in the library 512. The query coordinator 504 may obtain the metadata from the library 512.

Based on parsing the query and/or the metadata (e.g., the capability of one or more data processing systems configured in and/or indicated by the metadata), the query coordinator 504 can identify one or more data processing systems (e.g., the first data processing system 502, the second data processing system 514, etc.) that can access data associated with the query and can dynamically assign a respective portion of the query to all or a portion of the identified one or more data processing systems. For example, the query coordinator 504 can dynamically assign a first portion of the query to the first data processing system 502, a second portion of the query to the second data processing system 514, etc.

The query coordinator 504 may dynamically assign one or more portions of the query to one or more particular components and/or data processing systems based on one or more query parameters and/or component prioritization data. For example, the query coordinator 504 may assign a portion of the query to the second data processing system 514. The one or more query parameters may include parameters for identifying components and/or data processing systems to route a portion of a query for execution and the component prioritization data may include a ranking of the components and/or data processing systems to route a portion of a query for execution. The one or more query parameters may indicate parameters for executing a portion of a query and/or may indicate how to assign a portion of a query.

Based on assigning a portion of the query to the second data processing system 514, the query coordinator 504 (e.g., the one or more query driver(s) 508) can identify a scheme generator 506 of the one or more scheme generator(s) 506 associated with the second data processing system 514. In some cases, the query coordinator 504 may dynamically assign a scheme generator 506 to the second data processing system 514. In some cases, the query coordinator 504 may obtain data (e.g., from the library 512, from a user computing device, etc.) indicating that the scheme generator 506 is associated with the second data processing system 514.

In some cases, a scheme generator 506 may be associated with multiple data processing systems. For example, a scheme generator 506 may be associated with multiple data processing systems that are able to interpret the same query language, that utilize the same data semantics, etc.

Based on identifying the scheme generator 506, the query coordinator 504 can provide the query to the scheme generator 506 for generation of a query processing scheme. In some cases, the query coordinator 504 may provide a request to the scheme generator 506 including the portion of the query, an identifier of the second data processing system 514, etc.

Based on receiving the portion of the query, the scheme generator 506 may define a query processing scheme indicating a manner of identifying a set of data and processing the set of data according to the query. In some cases, the scheme generator 506 may use the library 512 to generate the query processing scheme. For example, the scheme generator 506 may parse the portion of the query to identify one or more expressions, commands, functions, data, operators, etc. of the portion of the query and, based on the one or more expressions, commands, functions, data, operators, etc., may obtain data from the library 512 indicating how to resolve (e.g., transform) the portion of the query to obtain a query processing scheme.

Based on the library 512, the scheme generator 506 may identify one or more expressions, commands, functions, data, operators, etc. of the portion of the query that are not resolvable by the second data processing system 514. Based on identifying the one or more expressions, commands, functions, data, operators, etc. of the portion of the query are not resolvable by the second data processing system 514, the scheme generator 506 may include a flag (e.g., an identifier, a marker, a placeholder, a stand-in, a proxy, a surrogate, etc.) in the query processing scheme indicating that a portion of the query processing scheme corresponding to the one or more expressions, commands, functions, data, operators, etc. is not resolvable by the second data processing system 514 and is to be resolved using a server 510 of the one or more server(s) 510.

In some cases, to define the query processing scheme, the scheme generator 506 may parse the query, migrate data into the query processing scheme, perform metadata binding, perform canonicalization (e.g., data normalization), etc.

The query processing scheme may include one or more expressions, commands, functions, data, operators, etc. (e.g., one or more transformed expressions, commands, functions, data, operators, etc.). In some cases, all or a portion of the one or more expressions, commands, functions, data, operators, etc. may not be resolvable (e.g., interpretable, understandable, translatable, etc.) by particular components (e.g., particular data processing systems). For example, a first portion of the one or more expressions, commands, functions, data, operators, etc. may be resolvable by the query coordinator 504 and the second data processing system 514 and a second portion of the one or more expressions, commands, functions, data, operators, etc. may be resolvable by the query coordinator 504 but may not be resolvable by the second data processing system 514.

In some cases, the query processing scheme may indicate resolution of a first portion of the query processing scheme occurs (e.g., is to occur) using the second data processing system 514 and resolution of a second portion of the query processing scheme occurs using the server 510.

The scheme generator 506 may route the query processing scheme to the one or more query driver(s) 508. The query coordinator 504 (e.g., the one or more query driver(s) 508) may identify a server 510 of the one or more server(s) 510 associated with the second data processing system 514. For example, the query coordinator 504 may identify a server 510 that is co-located with the second data processing system 514. In some cases, the query coordinator 504 may obtain data (e.g., from the library 512, from a user computing device, etc.) indicating that the server 510 is associated with the second data processing system 514. In some cases, different servers may be associated with different runtimes of the same data processing system. For example, a first server may be associated with a first runtime of the second data processing system 514 and a second server may be associated with a second runtime of the second data processing system 514.

Based on identifying, the server 510, the query coordinator 504 may route the query processing scheme to the server 510.

The server 510 may distribute the query processing scheme to the second data processing system 514. Based on the query processing scheme, the second data processing system 514 may execute at least a portion of the query assigned to the second data processing system 514. As discussed herein, in some cases, the second data processing system 514 may utilize the one or more worker node(s) 518 to execute the portion of the query.

The second data processing system 514 may parse the query processing scheme and may execute the portion of the query on data as stored by or provided by the data source 522. In some cases, as part of executing the portion of the query assigned to the second data processing system 514, the second data processing system 514 may use the one or more data source interface(s) 520 to access data from the data source 522.

To execute the portion of the query, the second data processing system 514 may generate a query plan (e.g., a physical query execution plan) based on the query processing scheme. Based on receiving the query processing scheme (e.g., and parsing the query processing scheme), the second data processing system 514 may determine a portion of the query processing scheme is not resolvable by the second data processing system 514 (and is to be resolved by the server 510). Based on determining the portion of the query processing scheme is not resolvable by the second data processing system 514 (and is to be resolved by the server 510), the second data processing system 514 may route a request for resolution of the portion of the query processing scheme to the server 510.

The server 510 may resolve the portion of the query processing scheme for the second data processing system 514 using the library 512. For example, to resolve the portion of the query processing scheme, the server 510 may perform a lookup in the library 512 to identify one or more expressions, commands, functions, data, operators, etc. that are assigned to the portion of the query processing scheme. In some cases, the server 510 may resolve the portion of the query processing scheme (e.g., automatically) without receiving a request from the second data processing system 514. In some cases, the server 510 may resolve the portion of the query processing scheme as the second data processing system 514 generates the query plan (e.g., simultaneously). In some cases, the second data processing system 514 may obtain an output (e.g., one or more expressions, commands, functions, data, operators, etc.) from the server 510 based on resolution of the portion of the query processing scheme and may generate the query plan based on the resolution of the portion of the query processing scheme. The second data processing system 514 may use the query plan to execute the portion of the query using the one or more worker node(s) 518.

Based on executing the portion of the query, the second data processing system may generate query results. In some cases, the second data processing system 514 may provide an output (e.g., the optimizations, results of execution of the portion of the query assigned to the second data processing system 514, etc.) to the query coordinator 504 (e.g., the one or more query driver(s) 508). In some cases, the query coordinator 504 may cause display of the query results via a user interface of a computing device.

2.2. Executing A Query Using A Dynamic Library

As described herein, a query coordinator 504 can obtain a query and route the query to a scheme generator 506 to define a query processing scheme for execution of a portion of the query by a second data processing system 514. The techniques described below can enable the execution of a query according to the query processing scheme using multiple data processing systems that may utilize different query languages, may execute queries according to different data semantics, may be optimized for execution of queries on different data (e.g., batch data v. streaming data, structured data v. unstructured data, etc.). The second data processing system 514 may not be able to resolve a portion of the query processing scheme. Instead, the second data processing system 514 may communicate with a server 510 of the query coordinator 504 to resolve the portion of the query processing scheme and enable execution of the query.

In some cases, data processing systems may be unable to execute queries based on query processing schemes that the data processing systems may be unable to resolve. This can cause inefficiencies as systems may be unable to execute particular queries. To facilitate execution of queries in a reliable and efficient manner, it may be helpful for a system to identify and facilitate execution of queries by data processing systems using a library.

Figure 6:
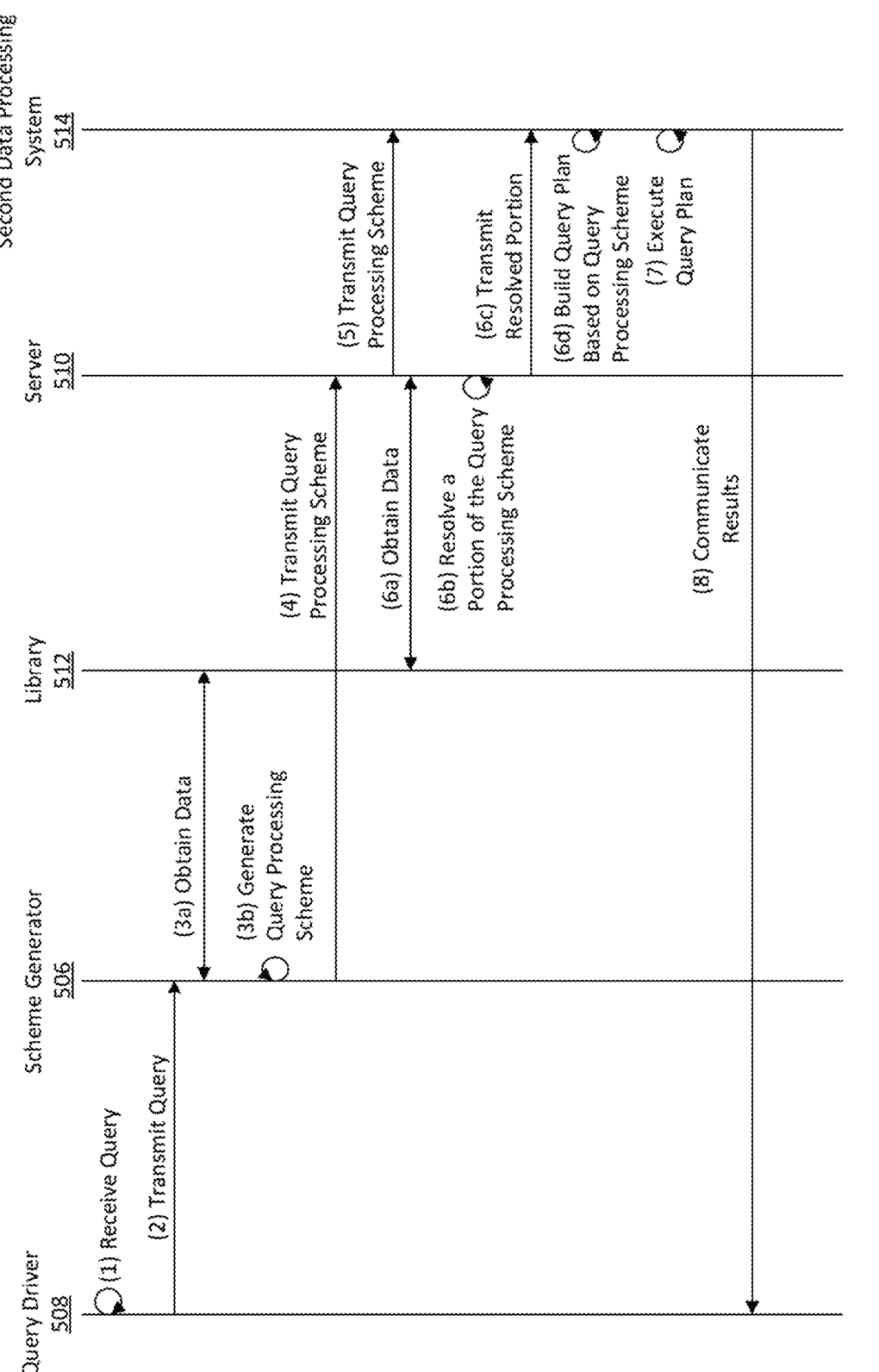
FIG. 6 is a data flow diagram illustrating an example of data flow and communications illustrating an example method for execution of a query based on a dynamic library.

FIG. 6 is a data flow diagram illustrating an example of data flow and communications between a variety of the components of a distributed data processing system, such as the query coordinator 504 as described with respect to FIG. 5, for processing and executing queries. The data flow diagram of FIG. 6 illustrates an example of data flow and communications between a query driver 508 of the query coordinator 504, a scheme generator 506 of the query coordinator 504, a server 510 of the query coordinator 504, and the second data processing system 514 for execution of a query using a library 512. However, it will be understood that in some cases, one or more of the functions described herein with respect to FIG. 6 can be omitted, performed concurrently or in a different order and/or performed by a different component of the distributed data processing system. Accordingly, the illustrated example and description should not be construed as limiting. Moreover, although one query driver 508, one scheme generator 506, one server 510, and one second data processing system 514 are shown, it will be understood the query coordinator 504 may utilize multiple libraries and/or may interface with multiple data processing systems that may utilize multiple data processing system interfaces to interact with other data processing systems. For example, the query coordinator 504 may interface with multiple second data processing systems 514.

Although not illustrated in FIG. 6, to perform various operations noted below, the query coordinator 504 may include and/or may be a query translator, a query planner, etc., the second data processing system 514 may include and/or may be a query planner, a data semantics enforcer, etc. In some cases, the query coordinator 504 may provide an extension to the second data processing system 514 (and may update the extension) that includes the server 510. In some cases, the query coordinator 504 may also provide one or more interfaces to the second data processing system 514.

At (1), the query driver 508 receives a query. In some cases, the query driver 508 can receive and process the query. As discussed herein, the query driver 508 (or a separate component of the query coordinator 504) can receive the query and identify the second data processing system 514 or a component (e.g., an indexer, a search head, etc. of the first data processing system 502) of the second data processing system 514 for execution of a portion of the query based on parsing the first query.

In some cases, the query driver 508 may identify the second data processing system 514 based on determining the second data processing system 514 can access data associated with the query (e.g., data to be processed based on the query). For example, the query may identify a set of data and a manner of processing the set of data and the query driver 508 may identify the second data processing system 514 may access the set of data.

In some cases, the query driver 508 may parse the query and/or metadata associated with the query. The query driver 508 may parse the query and/or the metadata based on one or more query parameters and/or component prioritization data and may assign one or more portions of the query to one or more data processing systems and/or components based on parsing. For example, the query driver 508 may assign the portion of the query to the second data processing system 514. The query driver 508 may parse the query to identify one or more portions of the query that do not satisfy the one or more query parameters for particular data processing systems (e.g., the query is not resolvable into a query language interpretable by the data processing system). In some cases, the query driver 508 may parse the query and the metadata to identify commands, functions, expressions, data, operators, etc. associated with the one or more portions of the query and may analyze the query based on the commands, functions, expressions, data, operators, etc. and the identified data processing systems (e.g., the first data processing system 502, the second data processing system 514, and/or specific components thereof such as a search head or an indexer).

In one example, the one or more query parameters may indicate that, for execution of a portion of a query, a data processing system and/or a component thereof should be capable of execution of the portion of the query (e.g., the first data processing system 502 and/or a component thereof should be capable of resolving one or more commands, functions, expressions, data, operators, etc. associated with the portion of the query). For example, a particular command within a query (e.g., StreamStats, TimeChart, etc.) may be mapped to an operation (e.g., via the expression compensations) that the first data processing system 502 can resolve and execute but that the second data processing system 514 cannot resolve and/or cannot execute.

In another example, the one or more query parameters may indicate that execution of at least a portion of a query by the first data processing system 502 and/or a component thereof should result in an execution time, a translation time, and/or a resource utilization that satisfies (e.g., is less than or matches) a threshold (e.g., a threshold value, a threshold range, etc.).

In another example, the one or more query parameters may indicate that, for execution of a portion of a query, a data processing system and/or a component thereof should be capable of resolving (e.g., is trained to process, processing satisfies a threshold, etc.) data associated with the portion of the query having a particular data type (e.g., having particular data structures.).

In another example, the one or more query parameters may indicate that the query driver 508 should assign a portion of a query to an indexer if the portion of the query includes a filter that reduces a set of data associated with the query by a threshold and assign the portion of the query to the second data processing system if the portion of the query does not include such a filter.

In another example, the one or more query parameters may indicate that the query driver 508 should assign a portion of a query to an indexer if the portion of the query is distributable and/or parallelizable (e.g., the portion of the query includes one or more commands, expressions, functions, etc. that are distributable).

The query driver 508 may identify a respective data processing system (or a component thereof) for execution of all or a portion of the portions of the query. In some cases, the query driver 508 may identify the data processing system based on component prioritization data (e.g., a hierarchical plurality of components and/or systems, a ranking, etc.). For example, the hierarchical plurality of components and/or systems may indicate a preference for the second data processing system 514 to execute a portion of a query and, if execution of the portion of the query by the second data processing system 514 does not satisfy one or more query parameters, the hierarchical plurality of components and/or systems may indicate a preference for a first component of the first data processing system 502 (e.g., an indexer) to execute the portion of the query and, if execution of the portion of the query by the second data processing system 514 or the indexer does not satisfy one or more query parameters, the hierarchical plurality of components and/or systems may indicate a preference for a second component of the first data processing system 502 (e.g., a search head of the first data processing system 502) to execute the portion of the query. In another example, the hierarchical plurality of components and/or systems may indicate a preference for the first component of the first data processing system 502 (e.g., an indexer) to execute a portion of the query and, if execution of the portion of the query by the first component does not satisfy one or more query parameters, the hierarchical plurality of components and/or systems may indicate a preference for the second data processing system 514 to execute the portion of the query and, if execution of the portion of the query by the second data processing system 514 or the first component does not satisfy one or more query parameters, the hierarchical plurality of components and/or systems may indicate a preference for a second component of the first data processing system 502 (e.g., a search head) to execute the portion of the query.

Based on identifying the second data processing system 514 for execution of the portion of the query, the query driver 508 may identify a scheme generator 506 of a plurality of scheme generators of a query coordinator 504. In some cases, the query driver 508 may identify a scheme generator 506 associated with (e.g., assigned to) the second data processing system 514. For example, the query coordinator 504 may include and/or may be associated with a plurality of scheme generators 506 and all or a portion of the plurality of scheme generators 506 may be associated with a respective data processing system of a plurality of data processing systems. In some cases, the query coordinator 504 may include and/or may be associated with a single scheme generator 506 and the query driver 508 may identify the scheme generator 506.

At (2), the query driver 508 transmits the query to the scheme generator 506. The query driver 508 may transmit the query to the scheme generator 506 in response to identifying the scheme generator 506.

At (3a), the scheme generator 506 obtains data from the library 512. To generate the query processing scheme, the scheme generator 506 may receive the portion of the query and process the portion of the query to identify one or more commands, expressions, functions, data, operators, etc. associated with the query. Based on the identified one or more commands, expressions, functions, data, operators, etc., the scheme generator 506 may use the library 512 to identify how to resolve the portion of the query. For example, the scheme generator 506 may use the library 512 to identify translations, definitions, etc. of the identified one or more commands, expressions, functions, data, operators, etc.

At (3b), the scheme generator 506 generates a query processing scheme using the data obtained from the library 512 (e.g., that indicates translations, definitions, etc. of a plurality of commands, expressions, functions, data, operators, etc.). For example, the query processing scheme may include or may be a query plan, a command tree (e.g., a Catalyst tree), query instructions, etc. The query processing scheme may indicate the portion of the query for execution by the second data processing system 514.

In some cases, the query may correspond to a first query language (e.g., SPL1, SPL2. SPL2 SQL). To process the query, the scheme generator 506 may translate the query from a first query language to a second query language. For example, the query may correspond to SPL1 and the scheme generator 506 may translate the query from SPL1 to SPL2. In some cases, the query may correspond to SPL2 (e.g., the query driver 508 may obtain the first query in SPL2). In some cases, the first query may correspond to SPL2 SQL (e.g., the query driver 508 may obtain the first query in SPL2 SQL).

Based on identifying the second data processing system 514 for execution of the portion of the query, the query driver 508 (or a separate component of the query coordinator 504) may identify a server 510 of a plurality of servers of the query coordinator 504. In some cases, the query driver 508 may identify a server 510 associated with (e.g., assigned to, co-located with, etc.) the second data processing system 514. For example, the query coordinator 504 may include and/or may be associated with a plurality of servers and all or a portion of the plurality of servers may be associated with a respective data processing system of a plurality of data processing systems. In some cases, the query driver 508 may identify a server 510 associated with a runtime of the second data processing system 514. For example, the query coordinator 504 may include and/or may be associated with a plurality of servers and all or a portion of the plurality of servers may be associated with a respective runtime of a respective data processing system of a plurality of data processing systems. In some cases, the query coordinator 504 may include and/or may be associated with a single server 510 and the query driver 508 may identify the server 510.

At (4), the scheme generator 506 transmits the query processing scheme to the server 510. The scheme generator 506 may transmit the query to the server 510 in response to identifying the server 510 and/or generating the query processing scheme.

At (5), the server 510 transmits the query processing scheme to the second data processing system 514. In some cases, the server 510 may transmit the query processing scheme and instructions to generate a query plan for execution of a corresponding portion of the query based on the query processing scheme.

Based on receiving and parsing the query processing scheme, the second data processing system 514 may determine a portion of the query processing scheme is not resolvable by the second data processing system 514 (and is to be resolved by the server 510). Based on determining the portion of the query processing scheme is not resolvable by the second data processing system 514 (and is to be resolved by the server 510), the second data processing system 514 may route a request for resolution of the portion of the query processing scheme to the server 510.

At (6a), the server 510 obtains data from the library 512. For example, to resolve the portion of the query processing scheme, the server 510 may perform a lookup in the library 512 to identify one or more expressions, commands, functions, data, operators, etc. that are assigned to the portion of the query processing scheme.

At (6b), the server 510 resolves a portion of the query processing scheme. Based on receiving the request for resolution of the portion of the query processing scheme, the server 510 may resolve the portion of the query processing scheme for the second data processing system 514 using the library 512.

In some cases, the server 510 may resolve the portion of the query processing scheme (e.g., automatically) without receiving a request from the second data processing system 514. For example, the server 510 may automatically route the query processing scheme and a resolved portion of the query processing scheme to the second data processing system 514.

At (6c), the server 510 transmits the resolved portion of the query processing scheme to the second data processing system 514. For example, the second data processing system 514 may obtain an output (e.g., one or more resolved expressions, commands, functions, data, operators, etc.) from the server 510 based on resolution of the portion of the query processing scheme and may generate the query plan (e.g., a portion of the query plan) based on the output.

At (6d), the second data processing system 514 builds a query plan based on the query processing scheme (e.g., the resolved portion of the query processing scheme). In some cases, the server 510 may resolve (e.g., simultaneously) the portion of the query processing scheme as the second data processing system 514 generates the query plan (e.g., a portion of the query plan). For example, the server 510 and the second data processing system 514 may simultaneously resolve different portions of the query processing scheme.

At (7), the second data processing system 514 executes the query plan. The second data processing system 514 may use the query plan to execute the portion of the query using one or more worker node(s) 518. For example, based on the query plan, the second data processing system 514 may assign the one or more worker node(s) 518 to obtain and/or process particular data for execution of the portion of the query.

The second data processing system 514 may obtain results (e.g., query results for the portion of the query) based on the execution of the query plan.

At (8), the second data processing system 514 communicates the results to the query driver 508. In some cases, the second data processing system 514 may provide the results to a separate component of the query coordinator 504. In some cases, the second data processing system 514 may provide the results to a user computing device (e.g., directly). In some cases, the first data processing system 502, the query coordinator 504, and/or the second data processing system 514 may perform a join of the query results and second query results.

2.3. Execution Of A Query Based On Resolution Of A Query Processing Scheme

As described herein, a query coordinator 504 can obtain a query and route the query to a scheme generator 506 to define a query processing scheme for execution of a portion of the query by a second data processing system 514. The second data processing system 514 may communicate with a server 510 of the query coordinator 504 to resolve a portion of the query processing scheme that is not resolvable by the second data processing system 514 for execution of the query.

In some cases, data processing systems may be unable to execute queries based on particular query processing schemes. This can cause inefficiencies as queries may be routed to a data processing system that may not satisfy one or more query parameters in executing the query.

Figure 7:
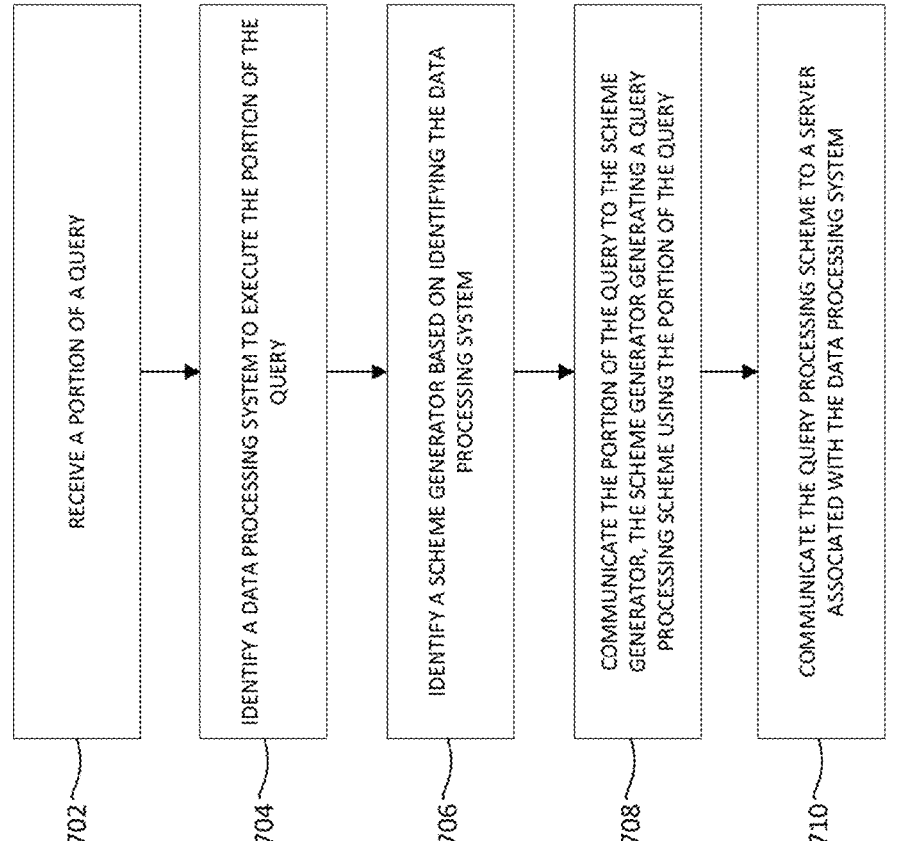
FIG. 7 is a flow diagram illustrative of an example of a routine, implemented by a query coordinator, for execution of a query based on a dynamic library.

Turning to FIG. 7, an illustrative algorithm or routine 700 will be described for a query processing and execution process. The routine 700 may be implemented, for example, by the query coordinator 504 described herein with reference to FIG. 5. The routine begins at block 702, where the query coordinator 504 receives a portion of a query (e.g., a first portion of the query). The query coordinator 504 may receive the query (e.g., the portion of the query) from a first data processing system 502 (e.g., a first distributed data processing system).

In some cases, the first data processing system 502 may include a plurality of servers. All or a portion of the plurality of servers may be associated with a respective data processing system of a plurality of data processing systems (e.g., a plurality of distributed data processing systems). In some cases, the plurality of data processing systems may be separate and distinct form the first data processing system 502.

In some cases, the first data processing system 502 may implement the query coordinator 504.

At block 704, the query coordinator 504 identifies a data processing system 514 (e.g., the second data processing system 514) to execute the portion of the query. For example, the data processing system 514 may be a second distributed data processing system.

At block 706, the query coordinator 504 identifies a scheme generator 506 (e.g., a first scheme generator) based on identifying the data processing system 514. The query coordinator 504 may identify the scheme generator 506 from a plurality of scheme generators.

In some cases, the first data processing system 502 may include the plurality of scheme generators. All or a portion of the plurality of scheme generators may be associated with a respective data processing system of the plurality of data processing systems.

At block 708, the query coordinator 504 communicates the portion of the query to the scheme generator 506. The scheme generator 506 may generate a query processing scheme (e.g., a distributed query execution plan) using the portion of the query. The query processing scheme may include a plurality of processing phases (e.g., layers) for executing the portion of the query by the data processing system 514. In some cases, the query coordinator 504 may communicate the portion of the query to the scheme generator in response to identifying the data processing system 514.

In some cases, the scheme generator 506 may generate the query processing scheme for the data processing system 514 using a library 512 (e.g., a dynamic library). For example, the library 512 may indicate how to resolve (e.g., interpret, translate, define, etc.) the query processing scheme (e.g., one or more commands, operators, functions, expressions, data, etc. of the query processing scheme) and/or the portion of the query (e.g., one or more commands, operators, functions, expressions, data, etc. of the portion of the query). In another example, the library 512 may indicate one or more definitions. Further, the library 512 may indicate one or more definitions are associated with particular portions of the query processing scheme.

In some cases, the query coordinator 504 may identify one or more updates to the library 512 based on an input from a computing device. The query coordinator 504 may update the library 512 according to the one or more updates (e.g., may update definitions of the library 512) and may obtain an updated library (e.g., an updated dynamic library).

The query processing scheme may indicate resolution (e.g., interpretation, translation, definition, etc.) of a first portion of the query processing scheme (e.g., one or more commands, operators, functions, expressions, data, etc.) occurs using the server 510. For example, the first portion of the query processing scheme may not be resolvable (e.g., may not be interpretable) by the data processing system 514 but may be resolvable (e.g., may be interpretable) by the first data processing system 502 while a second portion of the query processing scheme may be resolvable by the data processing system 514 and the first data processing system 502. In some cases, the query processing scheme may indicate resolution of a second portion of the query processing scheme occurs using the data processing system 514. For example, the second portion of the query processing scheme may be resolvable by the data processing system 514.

At block 710, the query coordinator 504 communicates the query processing scheme to a server 510 associated with the data processing system 514. In some cases, the server may be a server of the first data processing system 502. In some cases, the server may be co-located with the data processing system 514. The server 510 may communicate the query processing scheme to the data processing system 514.

The server 510 may resolve the first portion of the query processing scheme for the data processing system 514 using the library 512. In some cases, the library 512 may be a library of the first data processing system 502. In some cases, the data processing system 514 may not be able to access the library 512 and, therefore, may not be able to resolve the first portion of the query processing scheme. In some cases, the library 512 may be updated subsequently to the scheme generator 506 generating the query processing scheme, the query coordinator 504 communicating the query processing scheme to the server 510, and/or the server communicating the query processing scheme to the data processing system 514.

In some cases, the data processing system 514 may request resolution of the first portion of the query processing scheme (e.g., by the server 510) based on the query processing scheme indicating resolution of the first portion of the query processing scheme occurs using the server 510. The server 510 may resolve the first portion of the query processing scheme for the data processing system 514 in response to the request.

Based on resolving the first portion of the query processing scheme, the server 510 may communicate an output to the data processing system 514 (e.g., indicating the resolution of the first portion of the query processing scheme).

In some cases, the server 510 may resolve the first portion of the query processing scheme as the data processing system 514 generates a query plan (e.g., a physical query execution plan) based on the query processing scheme (e.g., and an output of the server 510). For example, the server 510 may resolve the first portion of the query processing scheme in unison with (e.g., simultaneously with) the data processing system 514 generating the query plan.

The data processing system 514 may use the query plan to execute the portion of the query. For example, the data processing system 514 may use the query plan to execute the portion of the query using a plurality of worker nodes of the data processing system 514.

In some cases, the data processing system 514 may generate query results based on execution of the portion of the query using the query plan. The query coordinator 504 may receive the query results from the data processing based on the execution of the portion of the query using the query plan.

In some cases, the first data processing system 502 may execute a second portion of the query and may generate second query results. All or a portion of the data processing system 514, the first data processing system 502, or the query coordinator 504 may perform a join of query results (e.g., a join of query results generated by the data processing system 514 and query results generated by the first data processing system 502) based on execution of the corresponding portions of the query.

3.0. Data Processing System Architecture

Figure 8:
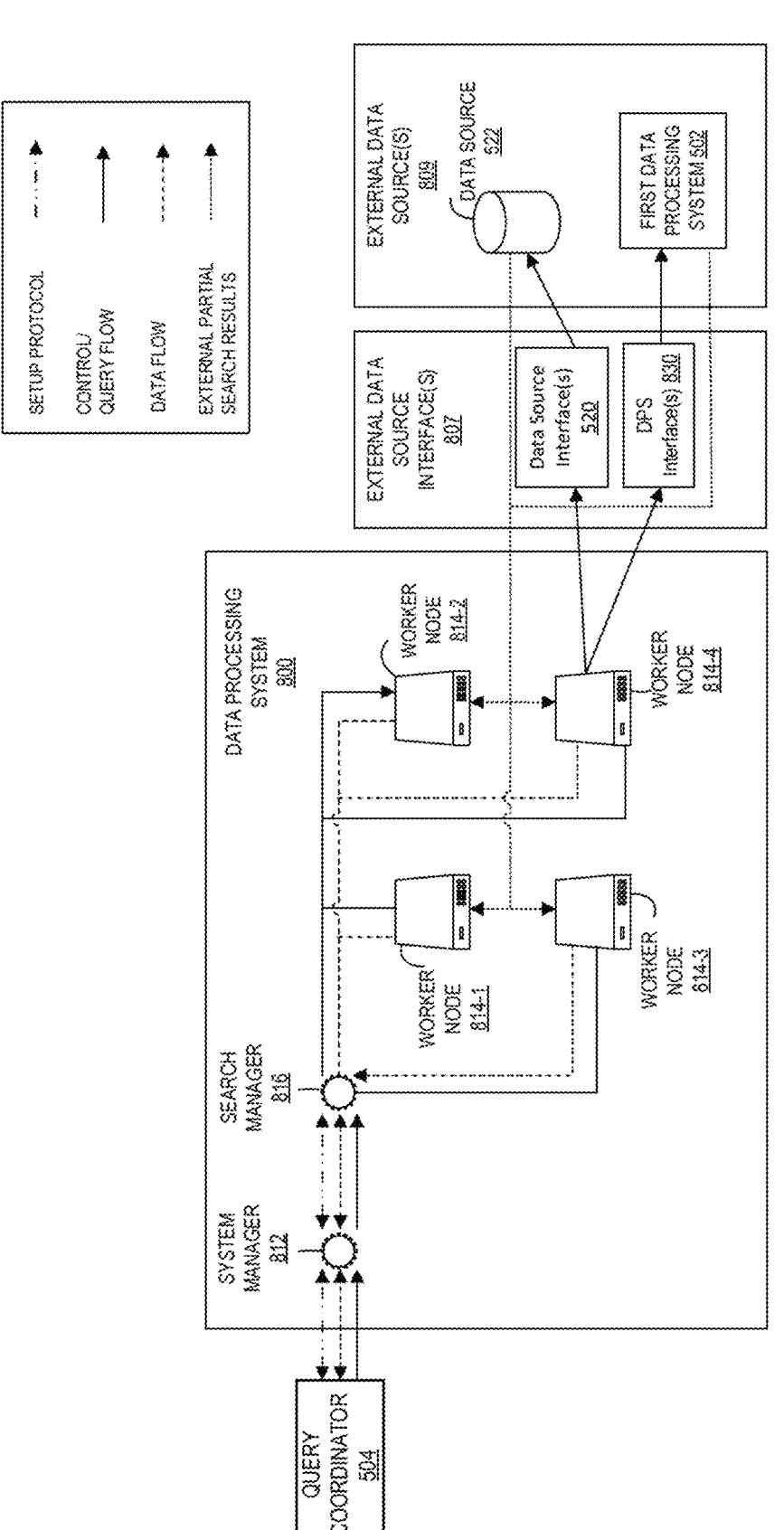
FIG. 8 is a system diagram illustrating a data fabric service system architecture ("DFS system") in which an embodiment may be implemented.

FIG. 8 is a system diagram illustrating an example of a data processing system 800, such as the second data processing system 514, communicatively coupled with a query coordinator 504, one or more external data source interface(s) 807, and one or more external data source(s) 809. In some cases, the data processing system 800 is configured to process and execute queries or query processing schemes received from the query coordinator 504.

In the illustrated example, the data processing system 800 includes a system manager 812, search manager 816, and multiple worker nodes 814. It will be understood that the data processing system 800 may include fewer or more components. For example, the data processing system 800 may include multiple system managers 812 and/or search managers 816, or a single worker node 814. In some cases, the data processing system 800 does not include long term storage to store data long term within the system. For example, the data processing system 800 may be configured to retrieve and process data from various (external) data sources.

In some cases, the data processing system 800 may receive queries or query processing schemes from the query coordinator 504, process the query processing schemes as described herein, provide an output to one or more external data source interface(s) 807 (e.g., one or more data source interface(s) 520) and/or one or more data processing system ("DPS") interfaces 830, receive partial results from external data sources 809 (e.g., from the data source 522, the first data processing system 502, and/or other data stores or data processing systems), process the partial results from the external data sources 809, and provide the results of the processing to the query coordinator 504. In certain cases, the data processing system 800 may obtain and harmonize results from the external data source 809 (e.g., from the data source 522 and/or from the first data processing system 502, which may also process data from the data source 522).

The system manager 812 may be communicatively coupled to the query coordinator 504 via a daemon and/or a network. In some embodiments, the system manager 812 may include software components running on a device of any system, including the query coordinator 504 and/or the first data processing system 502. As such, the system manager 812 can include software and underlying logic for establishing a logical connection to the query coordinator 504.

Although shown as separate components, the system manager 812 and the search manager 816 may reside on the same machine, or may be distributed across multiple machines. In some embodiments, running the system manager 812 and the search manager 816 on the same machine can increase performance of the data processing system 800 by reducing communications over networks. As such, the query coordinator 504 can interact with the system manager 812 and the search manager 816 residing on the same machine or on different machines. For example, the query coordinator 504 can dispatch requests for search queries to the system manager 812, which can spawn search managers 816 for each search query.

Other functions of the search manager 816 can include providing data isolation across different searches based on role/access control, as well as fault tolerance (e.g., localized to a search head). For example, if a search operation fails, then its spawned search manager may fail but other search managers for other searches can continue to operate.

The query coordinator 504 may receive a search query as described herein. For example, an analyst may submit a search query to the query coordinator 504 over a network from an application (e.g., web browser) running on a client device, through a network portal (e.g., website). In another example, the query coordinator 504 may receive the search query in accordance with a schedule of search queries. The search query can be expressed in a variety of languages such as a pipeline search language, a structured query language, etc.

The query coordinator 504 may process the search query to determine whether the data processing system 800 is to handle the search query. In some embodiments, if the search query only requires searching the first data processing system 502, the query coordinator 504 may communicate the search query to the first data processing system 502 for execution. In some embodiments, however, the query coordinator 504 can invoke or engage the data processing system 800 to utilize the worker nodes 814 to receive partial results from the first data processing system 502 alone (or other data processing systems), search data source 522 alone (or other data sources), or search both and harmonize the partial search results of the first data processing system 502 and the data source 522 (or other external data sources), and return the search results to the query coordinator 504 via the system manager 812 and/or the search manager 816.

If query coordinator 504 determines that the data processing system 800 is to handle the search query, then the query coordinator 504 can invoke and engage the data processing system 800. Accordingly, in some embodiments, the query coordinator 504 can engage the data processing system 800 when a search query is to be applied to the first data processing system 502 and/or other data sources, or is otherwise to be handled by the data processing system 800. The query coordinator 504 can pass a search query and/or a defined query processing scheme to the system manager 812, which can create (e.g., spawn) a search manager (e.g., search manager 816) to conduct the search. As described herein, in some cases, the search query and/or query processing scheme passed to the data processing system 800 can identify some portion of the query to be executed by the first data processing system 502 and/or another portion to be executed by the data processing system 800.

The search manager 816 can process the query processing scheme to generate one or more optimizations for the search query and provide those optimization to a one or more DPS interface(s) 830 or other interface(s) 807. As described herein, the one or more DPS interface(s) 830 may generate a query for the first data processing system 502 using the optimizations and/or translate the (optimized) query, and communicate the query, optimized query, and/or translated (optimized) query to the first data processing system 502 for execution. In the illustrated example, the search manager 816 provides the outputs or optimizations to the one or more DPS interface(s) 830 via worker node 814-4. It will be understood, however, that the search manager 816 may provide the outputs or optimizations to the one or more DPS interface(s) 830 directly (e.g., without the use of a worker node 814).

The search manager 816 can collect and aggregate partial search results from the first data processing system 502 and/or the worker nodes 814, and communicate the aggregate partial search results to the query coordinator 504. In some embodiments, the system manager 812, query coordinator 504, or the worker nodes 814 can produce the final search results, which the query coordinator 504 can cause to be presented on a user interface of a display device.

The worker nodes 814 may be implemented on one or more computing devices. In some cases, the worker nodes 814 are implemented on separate computing devices. In certain cases, the worker nodes 814 are implemented in a cloud environment, such as AWS. The worker nodes 814 may act as agents of the system manager 812 via the search manager 816, which can act on behalf of the query coordinator 504 to apply a search query to distributed data systems. For example, the system manager 812 can manage different search operations and balance workloads in the data processing system 800 by keeping track of resource utilization while the search manager 816 is responsible for executing search operations and obtaining the search results.

For example, the search manager 816 can cause the worker nodes 814 to apply a search query to the data source 522 (e.g., using the one or more data source interface(s) 520). The search manager 816 can also cause the worker nodes 814 to collect the partial search results from the first data processing system 502 (e.g., directly or via the one or more DPS interface(s) 830) or other data processing systems. Moreover, the search manager 816 can cause the worker nodes 814 to aggregate the partial search results collected from the first data processing system 502, the data source 522, and/or other external data sources 809.

Hence, the query coordinator 504 can offload at least some processing to the worker nodes 814 because the distributed worker nodes 814 can obtain data and/or process partial search results from external data sources 809. Moreover, the worker nodes 814 can aggregate the partial search results collected from the diverse data systems and transfer them to the search manager 816, which can finalize the search results and send them to the query coordinator 504. Aggregating the partial search results of the diverse data systems can include combining partial search results, arranging the partial search results in an ordered manner, and/or performing operations derive other search results from the collected partial search results (e.g., transform the partial search results).

Once a logical connection is established between the query coordinator 504 and the data processing system 800, the control and data flows can traverse the components of the data processing system 800. For example, the control flow can include instructions from the system manager 812 to the worker nodes 814 to carry out the operations detailed further herein. Moreover, the data flow can include aggregate partial search results transferred to the search manager 816 from the worker nodes 814. In some embodiments, the data processing system 800 can use a redistribute operator to distribute data in a sharded manner to the different worker nodes 814.

The worker nodes 814 can be communicatively coupled to each other, and to the external data sources 809. Each worker node 814 can include one or more software components or modules operable to carry out the functions of the data processing system 800 by communicating with the search manager 816, indexers, and the one or more external data source(s) 809. The modules can run on a programming interface of the worker nodes 814. An example of such an interface is APACHE SPARK, which is an open source computing framework that can be used to execute the worker nodes 814 with implicit parallelism and fault-tolerance.

In particular, SPARK includes an application programming interface (API) centered on a data structure called a resilient distributed dataset (RDD), which is a read-only multiset of data items distributed over a cluster of machines (e.g., the devices running the worker nodes 814). The RDDs function as a working set for distributed programs that offer a form of distributed shared memory.

Thus, the search manager 816 can act as a manager of the worker nodes 814, including their distributed data storage systems, to extract, collect, and store partial search results via their modules running on a computing framework such as SPARK. However, the embodiments disclosed herein are not limited to an implementation that uses SPARK. Instead, any open source or proprietary computing framework running on a computing device that facilitates iterative, interactive, and/or exploratory data analysis coordinated with other computing devices can be employed to run the modules for the system manager 812 to apply search queries to the distributed data systems.

Accordingly, the worker nodes 814 can harmonize the partial search results of the external data sources 809, and provide those aggregated partial search results to the search manager 816. In some embodiments, the search manager 816 or system manager 812 can further operate on the aggregated partial search results to obtain final results that are communicated to the query coordinator 504, which can output the search results as reports or visualizations on a display device.

The data processing system 800 is scalable to accommodate any number of worker nodes 814. As such, the data processing system 800 can scale to accommodate any number of distributed data systems upon which a search query can be applied and the search results can be returned to the search head and presented in a concise or comprehensive way for an analyst to obtain insights into big data.

In some embodiments, the data processing system 800 can be launched by using a modular input, which may refer to a platform add-on that can be accessed in a variety of ways such as, for example, over the Internet on a network portal. For example, the query coordinator 504 can use a modular input to launch the data processing system 800 (e.g., the system manager 812, the search manager 816, and/or the worker nodes 814). In some embodiments, a modular input can be used to launch a monitor function used to monitor the worker nodes 814 of the data processing system 800. In the event that a component of the data processing system 800 fails, the monitor may allow the system manager 812 and/or query coordinator 504 to detect the failed component and re-launch it or launch or reuse another component of the data processing system 800 to provide the functions of the component. In some embodiments, the monitor function for monitoring nodes can be launched and controlled by the search manager 816.

As described herein, the query coordinator 504 may execute a search phase generation process to define a search scheme (e.g., query processing scheme) based on the scope of the search query. The search phase generation process may involve an evaluation of the scope of the search query to define one or more phases to be executed by the first data processing system 502 and/or the data processing system 800, to obtain search results that would satisfy the search query. The search phases, or layers, may include a combination of phases for initiating search operations, searching the first data processing system 502, searching the data source 522, or other data sources 809, and/or finalizing search results for return back to the query coordinator 504.

In some embodiments, the combination of search phases can include phases for operating on the partial search results retrieved from the first data processing system 502 and/or other external data sources 809. For example, a search phase may include correlating or combining partial search results of the first data processing system 502 (e.g., from a search head or indexers of the first data processing system 502) and/or other external data sources 809. In some embodiments, a combination of phases may be ordered as a sequence that requires an earlier phase to be completed before a subsequent phase can begin. However, the disclosure is not limited to any combination or order of search phases. Instead, a search scheme can include any number of search phases arranged in any order that could be different from another search scheme applied to the same or another arrangement or subset of data systems.

For example, a first search phase may be executed by the worker nodes 814 to extract and collect partial search results from the data source 522. A second search phase may be executed by the first data processing system 502 to process other data from the data source 522 (or another data source) and communicate the partial search results to the worker nodes 814 (e.g., in parallel from indexers of the first data processing system 502 and/or from a search head of the first data processing system 502). As such, the second phase involves collecting the partial search results from the first data processing system 502. A third search phase may be executed by the worker nodes 814 to aggregate (e.g., combine and/or operate on) the partial search results of the first data processing system 502 and/or the data source 522. A fourth and fifth phase may involve further processing by the worker nodes 814 and/or additional processing by the search manager 816 to generate final search results. The search results may then be transmitted to the query coordinator 504. In some cases, a sixth search phase may involve further operating on the search results by the query coordinator 504 to obtain final search results that can be, for example, rendered on a user interface of a display device.

The query coordinator 504 may initiate a communications search protocol that establishes a logical connection with the worker nodes 814 via the search manager 816. Specifically, the query coordinator 504 may communicate information to the system manager 812 and/or the search manager 816, including a portion of the search scheme to be performed by the worker nodes 814. For example, a portion of the search scheme transmitted to the system manager 812 may include search phase(s) to be performed by the search manager 816 and the worker nodes 814. The information may also include specific control information enabling the worker nodes 814 to access the data sources 809 subject to the search query.

The query coordinator 504 may define an executable search process performed by the data processing system 800. For example, the system manager 812 or the search manager 816 can define a search process as a logical directed acyclic graph (DAG) based on the search phases included in the portion of the search scheme received from the query coordinator 504. The DAG can be a directed graph that defines a topological ordering of the search phases performed by the data processing system 800. As such, a sequence of the vertices of the DAG represents a sequence of search phases such that every edge is directed from earlier to later in the sequence of search phases. For example, the DAG may be defined based on a search string for each phase or metadata associated with a search string. The metadata may be indicative of an ordering of the search phases such as, for example, whether results of any search string depend on results of another search string such that the later search string must follow the former search string sequentially in the DAG.

As described herein, in some cases, the DAG may reference a portion of the query that is to be executed by the first data processing system 502 and/or a portion of the query to be executed by the data processing system 800.

The data processing system 800 may start executing the search phases that cause the worker nodes 814 to extract partial search results from the external data sources 809 and collect the extracted partial search results at the worker nodes 814, respectively. For example, the search service can start executing the search phases of the DAG that cause the worker nodes 814 to search the external data sources 809. Then, the worker nodes may collect the partial search results extracted from the external data sources 809.

The search phases executed by the data processing system 800 can also cause the worker nodes 814 to communicate with the one or more DPS interface(s) 830 of the first data processing system 502. For example, the worker nodes 814 (or the search manager 816) may communicate optimizations (or other outputs generated by the search manager 816 and/or worker nodes 814) and a query to the first data processing system 502. The one or more DPS interface(s) 830 may use the optimizations and query to generate a second query and may translate the query for execution by the first data processing system 502. The first data processing system 502 may execute the received (optimized and/or translated) query and return partial results. The worker nodes 814, in turn, can collect the partial search results from the first data processing system 502.

The worker nodes 814 can aggregate the partial search results and send them to the search manager 816. For example, the search manager 816 can begin collecting the aggregated search results from the worker nodes 814. The aggregation of the partial search results may include combining the partial search results of the first data processing system 502, data source 522 and/or other external data sources 809. In some embodiments, the aggregated partial search results can be time-ordered or unordered depending on the requirements of the type of search query.

In some embodiments, aggregation of the partial search results may involve performing one or more operations on a combination of partial search results. For example, the worker nodes 814 may operate on a combination of partial search results with an operator to output a value derived from the combination of partial search results. This transformation may be required by the search query. For example, the search query may be an average or count of data events that include specific keywords. In another example, the transformation may involve determining a correlation among data from different data sources that have a common keyword. As such, transforming the search results may involve creating new data derived from the partial search results obtained from the external data sources 809.

A data pipeline is formed to the query coordinator 504 through the search manager 816 and/or system manager 812 once the worker nodes 814 have received the partial search results from the external data sources 809 and aggregated the partial search results (e.g., and transformed the partial search results).

The aggregate search results received by the search manager 816 and/or system manager 812 may optionally be operated on to produce final search results. For example, the aggregate search results may include different statistical values of partial search results collected from different worker nodes 814. The search manager 816 and/or system manager 812 may operate on those statistical values to produce search results that reflect statistical values of the statistical values obtained from the all the worker nodes 814.

As such, the produced search results can be transferred in a big data pipeline to the query coordinator 504. The big data pipeline may be a pipeline of the data intake and query system 802 extended into the big data ecosystem. Hence, the search results are transmitting to the query coordinator 504 where the search query was received by a user. The query coordinator 504 can render the search results or data indicative of the search results on a display device. For example, the query coordinator 504 can make the search results available for visualizing on a user interface rendered via a computer portal.

In some embodiments, for example, some of the tasks described as being performed by the query coordinator 504 can be performed by the search manager 816 and/or system manager 812. For example, upon receiving the search query, the query coordinator 504 can determine that the data processing system 800 will handle the query. Accordingly, the query coordinator 504 can communicate the search query to the search service to initiate the search. In turn, the search manager 816 can define the search scheme and search process. As part of defining the search scheme and process, the search manager 816 can determine which external data sources 809 will be accessed. Once the scheme and process are defined, the search manager 816 can generate optimizations for the respective external data sources 809 and communicate the optimizations and the queries to the external data source interface(s) 807. The external data source interface(s) 807 can use the optimizations and queries to generate queries for the respective external data sources 809. The partial search results from both can be communicated to the worker nodes 814 for processing, which can aggregate them together. The results can then be provided to the search manager 816, further processed, and then communicated to the query coordinator 504 for rendering for the client device. In some cases, the further processing performed by the search manager 816 can include additional transforms on the results received from the worker nodes 814 based on the query. Accordingly, in such an embodiment, the data processing system 800 can be delegated some of the query coordinator 504 processing, thereby freeing up the query coordinator 504 to handle additional queries.

In some cases, the data processing system 800 may be deployed on a cloud computing platform (e.g., sharing processing resources and data in a multi-tenant network). A cloud-based system can include components of a data intake and query system extended by the data processing system 800 implemented on a cloud computing platform. An example of a suitable cloud computing platform include Amazon web services (AWS), which includes elastic MapReduce (EMR) web services. However, the disclosed embodiments are not so limited. Instead, the cloud-based system could include any cloud computing platform that uses EMR-like clusters ("EMR clusters").

The scale of the cloud-based system can be changed dynamically as needed based on any number of metrics. For example, the scale can change based on pricing constraints, performance of search operations, a received search query, etc.

The cloud-based system can include any number of system manager 812 and/or the search manager 816 as tenant(s) of a cloud computing platform. The components of the cloud-based data processing system 800 can be configured on the cloud computing platform.

The cloud-based data processing system 800 can include any number of worker nodes as cloud instances ("cloud worker nodes"). The cloud worker nodes can include software modules running on hardware devices of a cloud computing platform. The software modules of the cloud worker nodes may be communicatively coupled to the system manager 812 and/or the search manager 816, which may be communicatively coupled to a daemon of the query coordinator 504 to collectively carry out operations of the cloud-based system. The cloud worker nodes can be communicatively coupled to one or more external data source interface(s) 807 and/or external data sources 809.

The cloud-based system can ensure that data (e.g., partial search results) from diverse data sources (e.g., including time-indexed events with raw data or other type of data) are reduced (e.g., combined) at scale on each EMR node of the EMR cluster before sending the aggregated search results to the 504//or the search manager 816.

Figure 9:
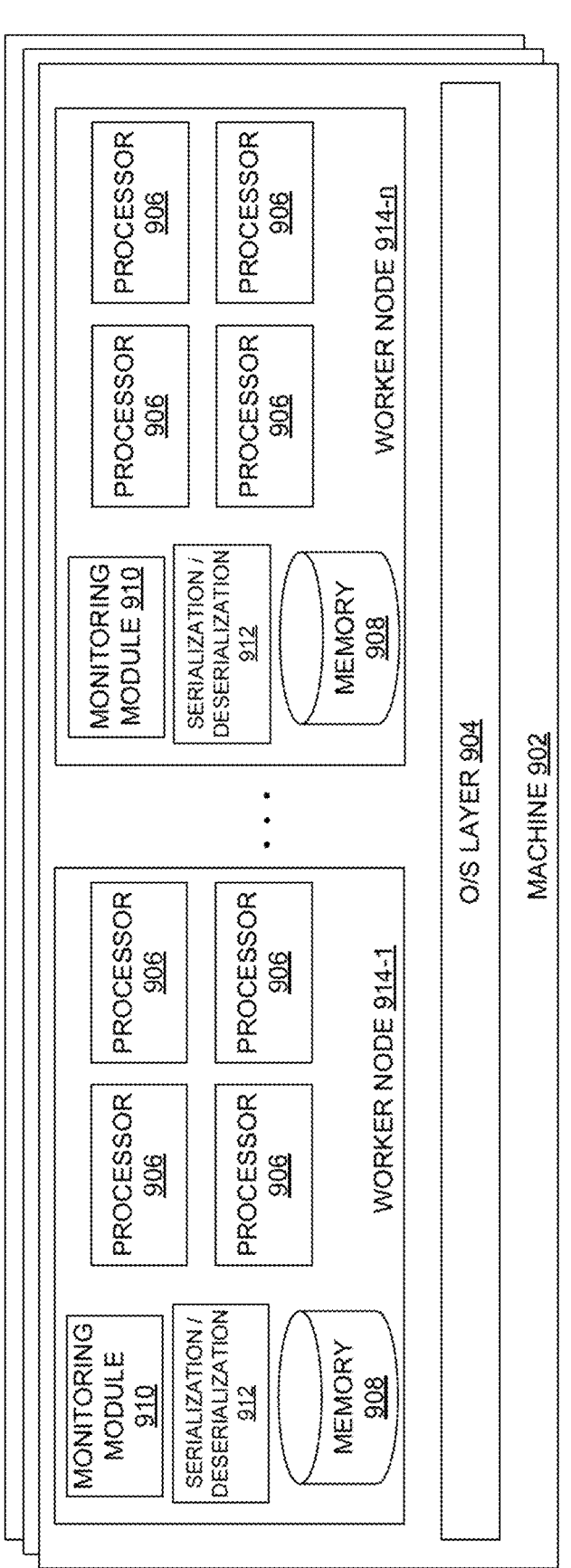
FIG. 9 is a block diagram illustrating an embodiment of multiple machines, each having multiple nodes.

FIG. 9 is a block diagram illustrating an embodiment of multiple machines 902, each having multiple worker nodes 914-1, 914-n (individually and collectively referred to as node 914 or nodes 914) residing thereon. The worker nodes 914 represent non-limiting examples of the worker nodes 516 and/or the worker nodes 814.

The worker nodes 914 across the various machines 902 can be communicatively coupled to each other, to the various components of the data processing system 800 (e.g., system manager 812, the search manager 816, etc.) and to the external data sources 809 (e.g., via the interface(s) 807).

The machines 902 can be implemented using multi-core servers or computing systems and can include an operating system layer 904 with which the nodes 914 interact. For example, in some embodiments, each machine 902 can include 32, 48, 64, or more processor cores, multiple terabytes of memory, etc.

In the illustrated embodiment, each node 914 includes four processors 906, memory 908, a monitoring module 910, and a serialization/deserialization module 912. It will be understood that each node 914 can include fewer or more components as desired. Furthermore, it will be understood that the nodes 914 can include different components and resources from each other. For example, node 914-1 can include fewer or more processors 906 or memory 908 than the node 914-n.

The processors 906 and memory 908 can be used by the nodes 914 to perform the tasks assigned to it by the search manager 816 and can correspond to a subset of the memory and processors of the machine 902. Thus, reference to a worker node 914 can also be understood to be a reference to one or more processors 906 of a worker node 914 and vice versa (e.g., allocating, assigning, or selecting a worker node 914 can refer to allocating, assigning, or selecting one or more processors 906 of a worker node 914). The serialization/deserialization module 912 can be used to serialize/deserialize data for communication between components of the system.

The monitoring module 910 can be used to monitor the state and utilization rate of the node 914 or processors 906 and report the information to the system manager 812. For example, the monitoring module 910 can indicate the number of processors in use by the node 914, the utilization rate of each processor, whether a processor is unavailable or not functioning, the amount of memory used by the processors 906 or node 914, etc.

In addition, each worker node 914 can include one or more software components or modules ("modules") operable to carry out the functions of the system by communicating with the system manager 812, the search manager 816, and/or external data sources 809. The modules can run on a programming interface of the worker nodes 914. An example of such an interface is APACHE SPARK, which is an open source computing framework that can be used to execute the worker nodes 914 with implicit parallelism and fault-tolerance.

In particular, SPARK includes an application programming interface (API) centered on a data structure called a resilient distributed dataset (RDD), which is a read-only multiset of data items distributed over a cluster of machines (e.g., the devices running the worker nodes 914). The RDDs function as a working set for distributed programs that offer a form of distributed shared memory.

Based on instructions received from a search manager 816, the worker nodes 914 can collect and process data or partial search results of a distributed network of data storage systems, and provide aggregated partial search results or finalized search results to the search manager 816 or other destination. Accordingly, the search manager 816 can act as a manager of the worker nodes 914, including their distributed data storage systems, to extract, collect, and store partial search results via their modules running on a computing framework such as SPARK. However, the embodiments disclosed herein are not limited to an implementation that uses SPARK. Instead, any open source or proprietary computing framework running on a computing device that facilitates iterative, interactive, and/or exploratory data analysis coordinated with other computing devices can be employed to run the modules for the search manager 816 to apply search queries to the distributed node 914.

As a non-limiting example, as part of processing a query, a node 914 can receive instructions from the search manager 816 to perform one or more tasks. For example, the node 914 can be instructed to intake data from a particular external data sources 809, parse received data from an external data sources 809 to identify relevant data in the dataset, collect partial results from the parsing, join results from multiple datasets, or communicate partial or completed results to a destination, etc. In some cases, the instructions to perform a task can come in the form of a DAG or query processing scheme. In response, the node 914 can determine what task it is to perform in the DAG, and execute it.

As part of performing the assigned task, the node 914 can determine how many processors 906 to allocate to the different tasks. In some embodiments the node can determine that all processors 906 are to be used for a particular task or only a subset of the processors 906. In certain embodiments, each processor 906 of the node 914 can be used in association with one or more partitions to intake, process, or collect data according to a task. Upon completion of the task, the node 914 can inform the search manager 816 that the task has been completed.

Depending on its context, partition can refer to different things. For example, in some cases, a partition can refer to a set of data in one or more data stores, such as an index, or a stream of data. In certain cases, a partition can refer to smaller sets of data, such as when data is partitioned (or split up) into smaller parts. In yet other cases, one or more partitions can be assigned to a processor 906 or a worker node 914, and reference to a partition performing an action can refer to a processor 906 performing the action on one or more groups of data or data entries assigned thereto. Similarly, in some cases, reference to assigning a job or action to a partition can refer to the assignment of a processor 906 or worker node 914 to perform that job or action. For example, the assignment of a partition to receive data from an external data source can refer to a processor 906 receiving data from the external data source and grouping the data into one or more groups or partitions of data. Thus, as used herein and based on the context provided, a partition can refer to an index, a task, a set or group of data, data entries, events, or records, or can refer to a processor 906 that performs a particular action on one or more groups or sets of data, data entries, or records. Further, in some instances, a partition can refer to a group of data, data entries, events, or records and computer-executable instructions that indicate how the group of data is to be processed by a processor 906 or worker node 914.

When instructed to intake data, the processors 906 of the node 914 can be used to communicate with external data sources 809 (non-limiting examples: data source 522, first data processing system 502, etc.). Once the node 914 is in communication with the external data sources 809, it can intake the data from the external data sources 809. As described in greater detail herein, in some embodiments, multiple processors of a node (or different nodes) can be assigned to intake data from a particular source as one or more partitions.

When instructed to parse or otherwise process data, the processors 906 of the node 914 can be used to review the data and identify portions of the data that are relevant to the query. For example, if a query includes a request for events with certain errors or error types, the processors 906 of the node 914 can parse the incoming data to identify different events, parse the different events to identify error fields or error keywords in the events, and determine the error type of the error. In some cases, this processing can be similar to the processing described in greater detail above with reference to the indexers processing data to identify relevant results in the data stores.

When instructed to collect data, the processors 906 of the node 914 can be used to receive data from external data sources 809 or from another node 914. With continued reference to the error example, a collector partition can collect all of the errors of a certain type from one or more parsing partitions. For example, if there are seven possible types of errors coming from a particular external data sources 809, a collector partition could collect all type 1 errors (or events with a type 1 error), while another collector partition could collect all type 2 errors (or events with a type 2 error), etc.

When instructed to join results from multiple datasets, the processors 906 of the node 914 can be used to receive data corresponding to two different datasets and combine or further process them. For example, if data is being retrieved from an external data source and a data store of the indexers, join partitions could be used to compare and collate data from the different data stores in order to aggregate the results.

When instructed to communicate results to a particular destination, the processors 906 of the node 914 can be used to prepare the data for communication to the destination and then communicate the data to the destination. For example, in communicating the data to a particular destination, the node 914 can communicate with the particular destination to ensure the data will be received. Once communication with the destination has been established, the partition, or processor associated with the partition, can begin sending the data to the destination. As described in greater detail herein, in some embodiments, multiple partitions of a node (or different nodes) can be assigned to communicate data to a particular destination. Furthermore, the nodes 914 can be instructed to transform the data so that the destination can properly understand and store the data. Furthermore, the nodes can communicate the data to multiple destinations. For example, one copy of the data may be communicated to the search manager 816 and another copy can be communicated to another destination.

The system is scalable to accommodate any number of worker nodes 914. As such, the system can scale to accommodate any number of distributed data systems upon which a search query can be applied and the search results can be returned to the search head and presented in a concise or comprehensive way for an analyst to obtain insights into big data.

In some cases, the serialization/deserialization module 912 can generate and transmit serialized event groups. An event group can include the following information: number of events in the group, header information, event information, and changes to the cache or cache deltas. The serialization/deserialization module 912 can identify the differences between the pieces of information using a type code or token. As part of generating the group and serializing the data, the serialization/deserialization module 912 can determine the number of events to group, determine the order and field names for the fields in the events of the group, parse the events, determine the number of fields for each event, identify and serialize serializable field values in the event fields, and identify cache deltas.

4.0. Hardware Embodiment

Figure 10:
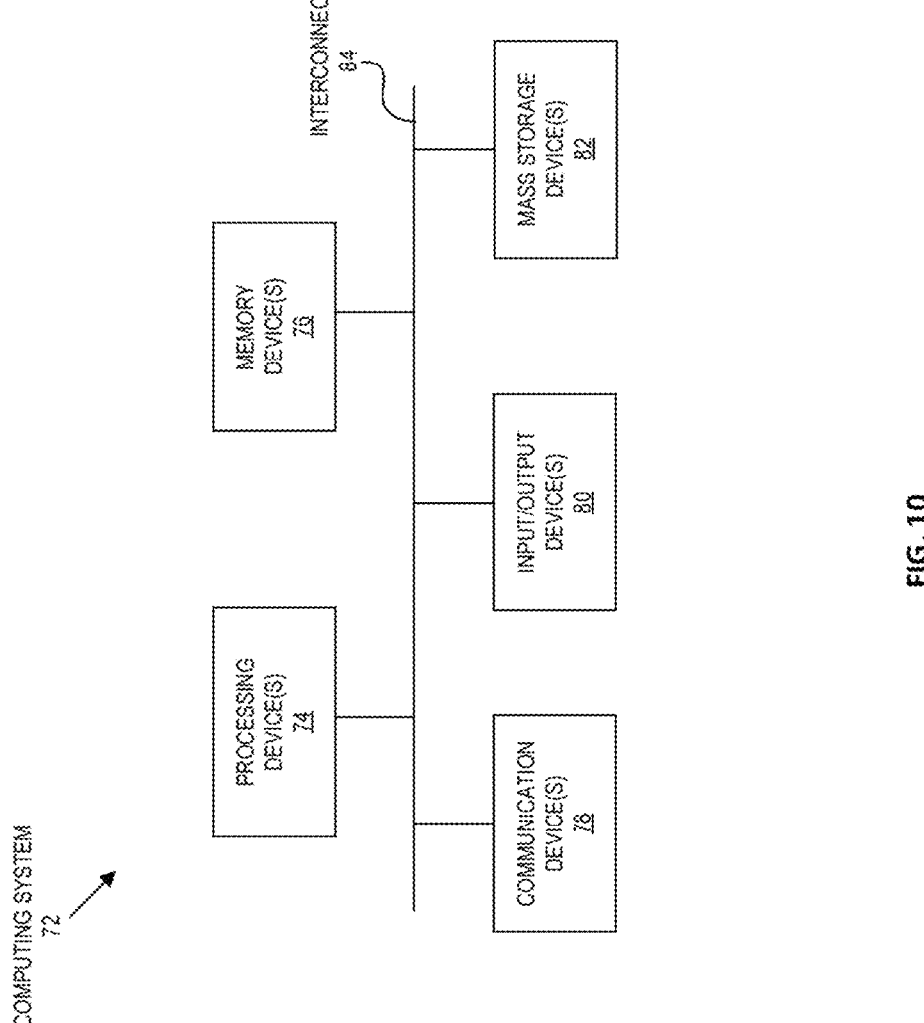
FIG. 10 is a block diagram illustrating a high-level example of a hardware architecture of a computing system in which an embodiment may be implemented.

FIG. 10 is a block diagram illustrating a high-level example of a hardware architecture of a computing system in which an embodiment may be implemented. For example, the hardware architecture of a computing system 72 can be used to implement any one or more of the functional components described herein (e.g., indexer, data intake and query system, search head, server computer system, edge device, etc.). In some embodiments, one or multiple instances of the computing system 72 can be used to implement the techniques described herein, where multiple such instances can be coupled to each other via one or more networks.

The illustrated computing system 72 includes one or more processing devices 74, one or more memory devices 76, one or more communication devices 78, one or more input/output (I/O) devices 80, and one or more mass storage devices 82, all coupled to each other through an interconnect 84. The interconnect 84 may be or include one or more conductive traces, buses, point-to-point connections, controllers, adapters, and/or other conventional connection devices. Each of the processing devices 74 controls, at least in part, the overall operation of the processing of the computing system 72 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 76 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 82 can be or include one or more hard drives, digital versatile disks (DVDs), flash memories, or the like. Each memory device 76 and/or mass storage device 82 can store (individually or collectively) data and instructions that configure the processing device(s) 74 to execute operations to implement the techniques described herein.

Each communication device 78 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 74, each I/O device 80 can be or include a device such as a display (which may be a touch screen display), audio speaker, keyboard, mouse or other pointing device, microphone, camera, etc. Note, however, that such I/O devices 80 may be unnecessary if the processing device 74 is embodied solely as a server computer.

In the case of a client device (e.g., edge device), the communication devices(s) 78 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 78 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 76). A processor (e.g., processing device(s) 74) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

5.0. Terminology

Computer programs typically comprise one or more instructions set at various times in various memory devices of a computing device, which, when read and executed by at least one processor (e.g., processing device(s) 74), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 76).

Any or all of the features and functions described herein can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described herein. Rather, the specific features and acts described herein are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described herein with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described herein to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application, in either this application or in a continuing application.

What is claimed is:

1. A method, comprising:
   receiving a portion of a query from a first distributed data processing system;
   identifying a second distributed data processing system to execute the portion of the query;
   identifying a first scheme generator from a plurality of scheme generators based on identifying the second distributed data processing system;
   communicating the portion of the query to the first scheme generator, wherein the first scheme generator generates a query processing scheme using the portion of the query, wherein the query processing scheme comprises a plurality of processing phases for executing the portion of the query by the second distributed data processing system; and
   communicating the query processing scheme to a server associated with the second distributed data processing system,
      wherein the query processing scheme indicates resolution of a first portion of the query processing scheme occurs using the server,
      wherein the server communicates the query processing scheme to the second distributed data processing system and resolves the first portion of the query processing scheme for the second distributed data processing system using a dynamic library as the second distributed data processing system generates a query plan, and
      wherein the second distributed data processing system uses the query plan to execute the portion of the query using a plurality of worker nodes of the second distributed data processing system.

2. The method of claim 1, wherein the query processing scheme is a distributed query execution plan, and wherein the query plan is a physical query execution plan.

3. The method of claim 1, wherein the dynamic library is of the first distributed data processing system.

4. The method of claim 1, wherein the server is of the first distributed data processing system, wherein the server is co-located with the second distributed data processing system.

5. The method of claim 1, wherein the first distributed data processing system comprises a plurality of servers, wherein each server of the plurality of servers is associated with a respective distributed data processing system of a plurality of distributed data processing systems, and wherein the plurality of distributed data processing systems is distinct and separate from the first distributed data processing system.

6. The method of claim 1, wherein each scheme generator of the plurality of scheme generators is associated with a respective distributed data processing system of a plurality of distributed data processing systems, and wherein the plurality of distributed data processing systems is distinct and separate from the first distributed data processing system.

7. The method of claim 1, further comprising:
   receiving query results based on execution of the portion of the query using the plurality of worker nodes.

8. The method of claim 1, wherein the query processing scheme further indicates resolution of a second portion of the query processing scheme occurs using the second distributed data processing system.

9. The method of claim 1, wherein the first portion of the query processing scheme comprises one or more of a command or an operator.

10. The method of claim 1, wherein the second distributed data processing system requests the resolution of the first portion of the query processing scheme based on the query processing scheme indicating the resolution of the first portion of the query processing scheme occurs using the server.

11. The method of claim 1, wherein the server resolves the first portion of the query processing scheme in response to a request received from the second distributed data processing system, wherein the server communicates an output to the second distributed data processing system based on resolving the first portion of the query processing scheme using the dynamic library, wherein the query plan is based on the output.

12. The method of claim 1, wherein the dynamic library indicates one or more definitions are associated with the first portion of the query processing scheme.

13. The method of claim 1, wherein the dynamic library indicates one or more definitions are associated with the first portion of the query processing scheme, the method further comprising:
   identifying one or more updates to the dynamic library based on input obtained from a computing device to obtain an updated dynamic library.

14. The method of claim 1, wherein the first scheme generator generates the query processing scheme using the dynamic library.

15. The method of claim 1, wherein the first portion of the query processing scheme is interpretable by the first distributed data processing system, and wherein a second portion of the query processing scheme is interpretable by the second distributed data processing system.

16. The method of claim 1, wherein communicating the portion of the query to the first scheme generator comprises:
   communicating the portion of the query to the first scheme generator in response to identifying the second distributed data processing system.

17. The method of claim 1, wherein the portion of the query comprises a first portion of the query, wherein a second portion of the query is executed by the first distributed data processing system.

18. The method of claim 1, wherein the portion of the query comprises a first portion of the query, wherein at least one of the first distributed data processing system or the second distributed data processing system performs a join of first query results based on execution of the first portion of the query and second query results based on execution of a second portion of the query.

19. A query coordinator comprising:

a data store; and one or more processors configured to:

receive a portion of a query from a first distributed data processing system;

identify a second distributed data processing system to execute the portion of the query;

identify a first scheme generator from a plurality of scheme generators based on identifying the second distributed data processing system;

communicate the portion of the query to the first scheme generator, wherein the first scheme generator generates a query processing scheme using the portion of the query, wherein the query processing scheme comprises a plurality of processing phases for executing the portion of the query by the second distributed data processing system; and communicate the query processing scheme to a server associated with the second distributed data processing system, wherein the query processing scheme indicates resolution of a first portion of the query processing scheme occurs using the server, wherein the server communicates the query processing scheme to the second distributed data processing system and resolves the first portion of the query processing scheme for the second distributed data processing system using a dynamic library as the second distributed data processing system generates a query plan, and wherein the second distributed data processing system uses the query plan to execute the portion of the query using a plurality of worker nodes of the second distributed data processing system.

20. Non-transitory computer-readable media including computer-executable instructions that, when executed by a query coordinator, cause the query coordinator to:

receive a portion of a query from a first distributed data processing system;

identify a second distributed data processing system to execute the portion of the query;

identify a first scheme generator from a plurality of scheme generators based on identifying the second distributed data processing system;

communicate the portion of the query to the first scheme generator, wherein the first scheme generator generates a query processing scheme using the portion of the query, wherein the query processing scheme comprises a plurality of processing phases for executing the portion of the query by the second distributed data processing system; and communicate the query processing scheme to a server associated with the second distributed data processing system, wherein the query processing scheme indicates resolution of a first portion of the query processing scheme occurs using the server, wherein the server communicates the query processing scheme to the second distributed data processing system and resolves the first portion of the query processing scheme for the second distributed data processing system using a dynamic library as the second distributed data processing system generates a query plan, and wherein the second distributed data processing system uses the query plan to execute the portion of the query using a plurality of worker nodes of the second distributed data processing system.

* * * * *